(12) United States Patent
Nakashima et al.

(10) Patent No.: US 11,122,177 B2
(45) Date of Patent: Sep. 14, 2021

(54) IMAGE READING DEVICE AND IMAGE FORMING APPARATUS INCLUDING IMAGE READING DEVICE

(71) Applicant: SHARP KABUSHIKI KAISHA, Sakai (JP)

(72) Inventors: Noritomo Nakashima, Sakai (JP); Makoto Higuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/932,637

(22) Filed: Jul. 17, 2020

(65) Prior Publication Data
US 2021/0044713 A1 Feb. 11, 2021

(30) Foreign Application Priority Data
Aug. 7, 2019 (JP) .............................. JP2019-145700

(51) Int. Cl.
*H04N 1/00* (2006.01)
(52) U.S. Cl.
CPC ..... *H04N 1/00718* (2013.01); *H04N 1/00591* (2013.01); *H04N 1/00604* (2013.01);
(Continued)
(58) Field of Classification Search
CPC ........... H04N 1/00718; H04N 1/00748; H04N 1/00591; H04N 1/00604; H04N 1/00777; H04N 2201/0094; H04N 2201/0081; H04N 2201/0096; H04N 1/00222; H04N 1/00737; H04N 2201/0044; H04N 1/00708; H04N 1/00771; H04N 1/00779; H04N 1/00801; H04N 1/00824; H04N 1/00962; H04N 1/38; H04N 1/3872; H04N 1/3873;
(Continued)

(56) References Cited

U.S. PATENT DOCUMENTS 3,825,251 A * 7/1974 Beery .................. B65H 3/0684
271/258.03
5,120,977 A * 6/1992 Dragon ...................... B41J 9/46
250/223 R (Continued)

FOREIGN PATENT DOCUMENTS

JP 5274522 B2 8/2013
JP 2015-164292 A 9/2015

*Primary Examiner* — Negussie Worku
(74) *Attorney, Agent, or Firm* — ScienBiziP, P.C.

(57) ABSTRACT

An image reading device reads two types of documents, a first document having a first size and a second document having a second size larger than the first size. A controller of the device causes the first document reader to read the first document and generate image data when the operation unit accepts a command. The first document reader reads a portion of the second document and generates image data on tilt of the second document when the operation unit accepts a command. The document tilt detector detects tilt of the second document based on the image data for detecting tilt of the second document. The document transporter stops transport of the second document when the document tilt detector detects tilt of the second document. The second document reader reads the second document and generates image data when the document tilt detector detects no tilt of the second document.

7 Claims, 23 Drawing Sheets

(52) U.S. Cl.
CPC ..... *H04N 1/00748* (2013.01); *H04N 1/00777* (2013.01); *H04N 2201/0094* (2013.01)

(58) Field of Classification Search
CPC ........... H04N 1/00127; H04N 1/00204; H04N 1/00795; H04N 1/00816; H04N 1/2034; H04N 2201/0404; H04N 1/00331; H04N 1/00408; H04N 1/00782; H04N 1/00798; H04N 1/024; H04N 1/107; H04N 1/121; H04N 1/32064; H04N 1/32358; H04N 1/40; B65H 2220/01; B65H 2220/02; B65H 2220/03; B65H 2220/11; B65H 2511/528; B65H 1/14; B65H 2402/441; B65H 2403/53; B65H 2404/1442; B65H 2551/15; B65H 2801/06; B65H 2801/39; B65H 3/06; B65H 3/5261; B65H 5/062; B65H 2511/212; B65H 2511/224; B65H 2511/51; B65H 2511/511; B65H 2511/515; B65H 2513/108; B65H 2513/511; B65H 7/06; B65H 2407/10; B65H 2601/11; B65H 3/5223; B65H 43/02; B65H 43/04; B65H 7/02; B65H 7/04; B65H 7/12; B65H 7/20; G03G 15/50; G03G 15/6511; G03G 15/6529; G03G 15/70; G03G 21/1638; G03G 2215/00341; G03G 2215/00544; G06F 1/1626; G06F 1/1696; G06F 2200/1632; G06K 2209/01; G06K 9/00456; G06K 9/00463; G06K 9/3283; G06T 2207/10008; G06T 2207/20132; G06T 2207/30176; G06T 7/11; G06T 7/13; H04L 63/083; H04L 63/0869; H04L 65/1096; H04L 67/141

USPC .......................................................... 358/474

See application file for complete search history.

(56) References Cited

U.S. PATENT DOCUMENTS

| | | | | |
|---|---|---|---|---|
| 5,828,939 | A * | 10/1998 | Yoshiuchi | G03G 15/60 399/388 |
| 8,953,225 | B2 * | 2/2015 | Yamada | H04N 1/00737 358/448 |
| 10,582,084 | B2 * | 3/2020 | Tokuda | H04N 1/00748 |
| 10,896,012 | B2 * | 1/2021 | Ito | H04N 1/3872 |
| 2002/0103757 | A1 * | 8/2002 | Jones | G06Q 10/10 705/45 |
| 2008/0290584 | A1 * | 11/2008 | Dunn | B65H 7/06 271/10.02 |
| 2009/0238620 | A1 * | 9/2009 | Onodera | H04N 1/00588 399/371 |
| 2012/0026562 | A1 | 2/2012 | Yoshimoto et al. | |
| 2014/0226191 | A1 * | 8/2014 | Enomoto | H04N 1/00591 358/496 |
| 2015/0009520 | A1 * | 1/2015 | Yamada | H04N 1/387 358/1.14 |
| 2017/0078506 | A1 * | 3/2017 | Yamada | H04N 1/00572 |
| 2018/0146106 | A1 * | 5/2018 | Fujinaga | H04N 1/00737 |
| 2019/0112139 | A1 * | 4/2019 | Hirayama | H04N 1/00002 |
| 2020/0382668 | A1 * | 12/2020 | Matsumoto | B65H 31/20 |

* cited by examiner

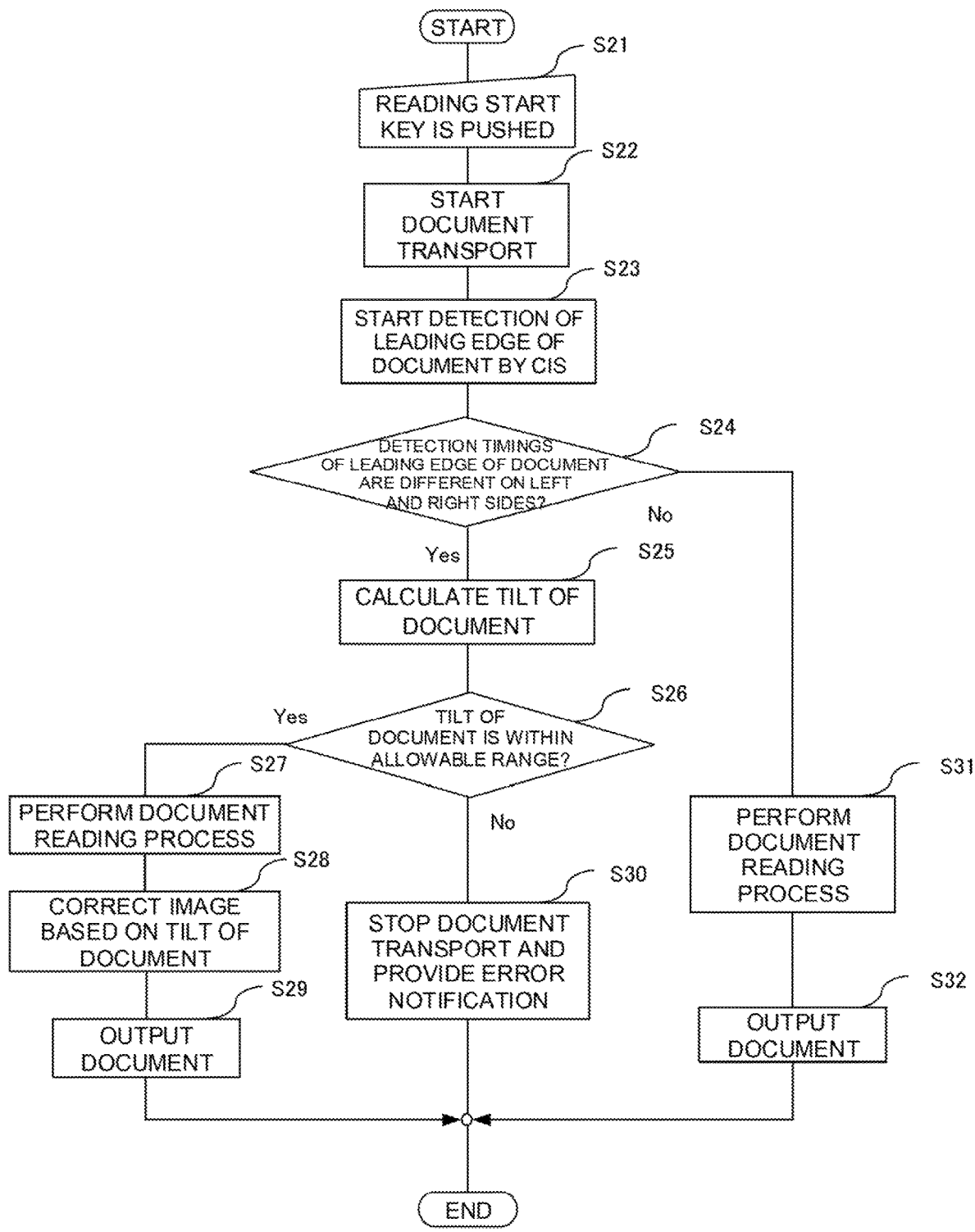

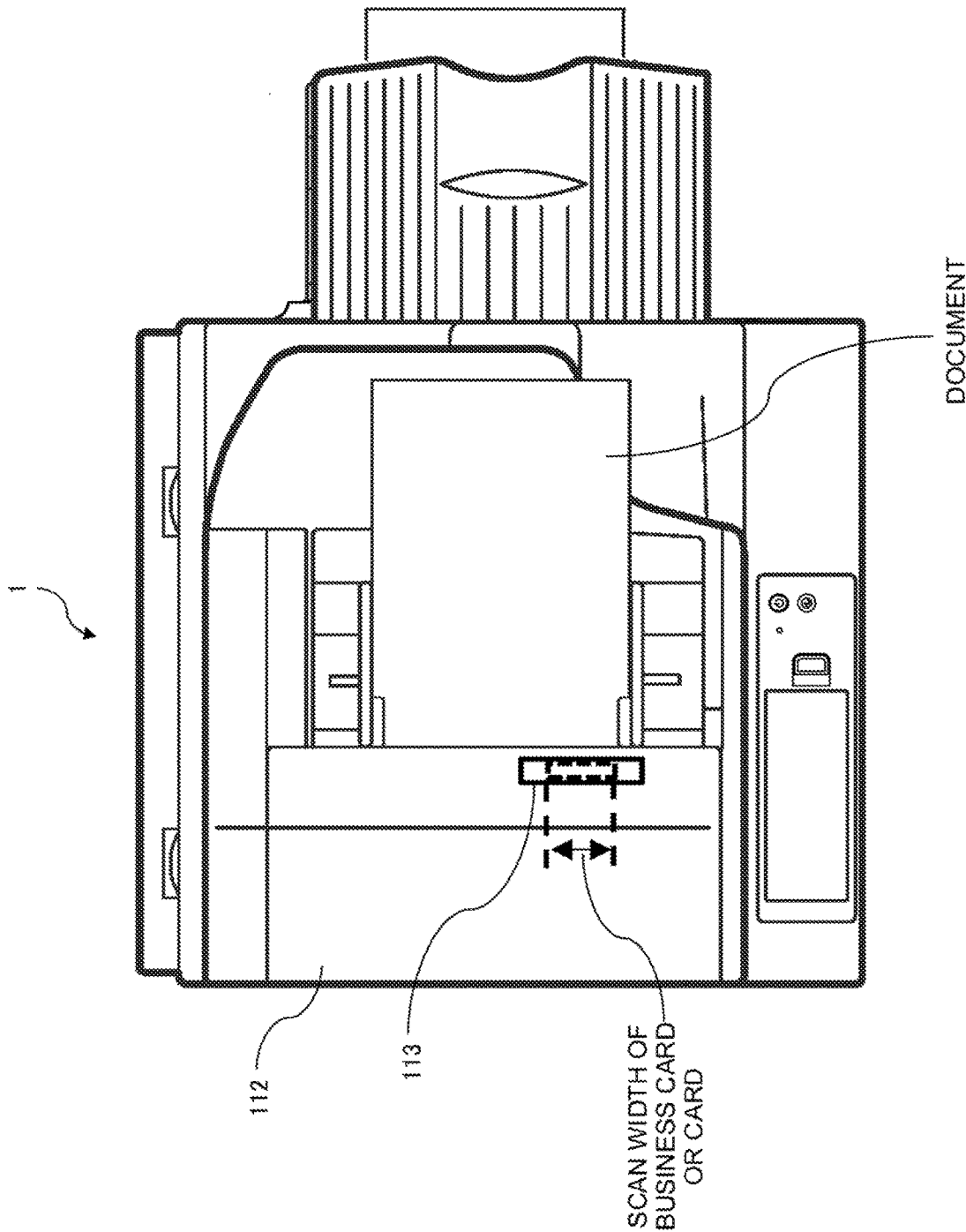

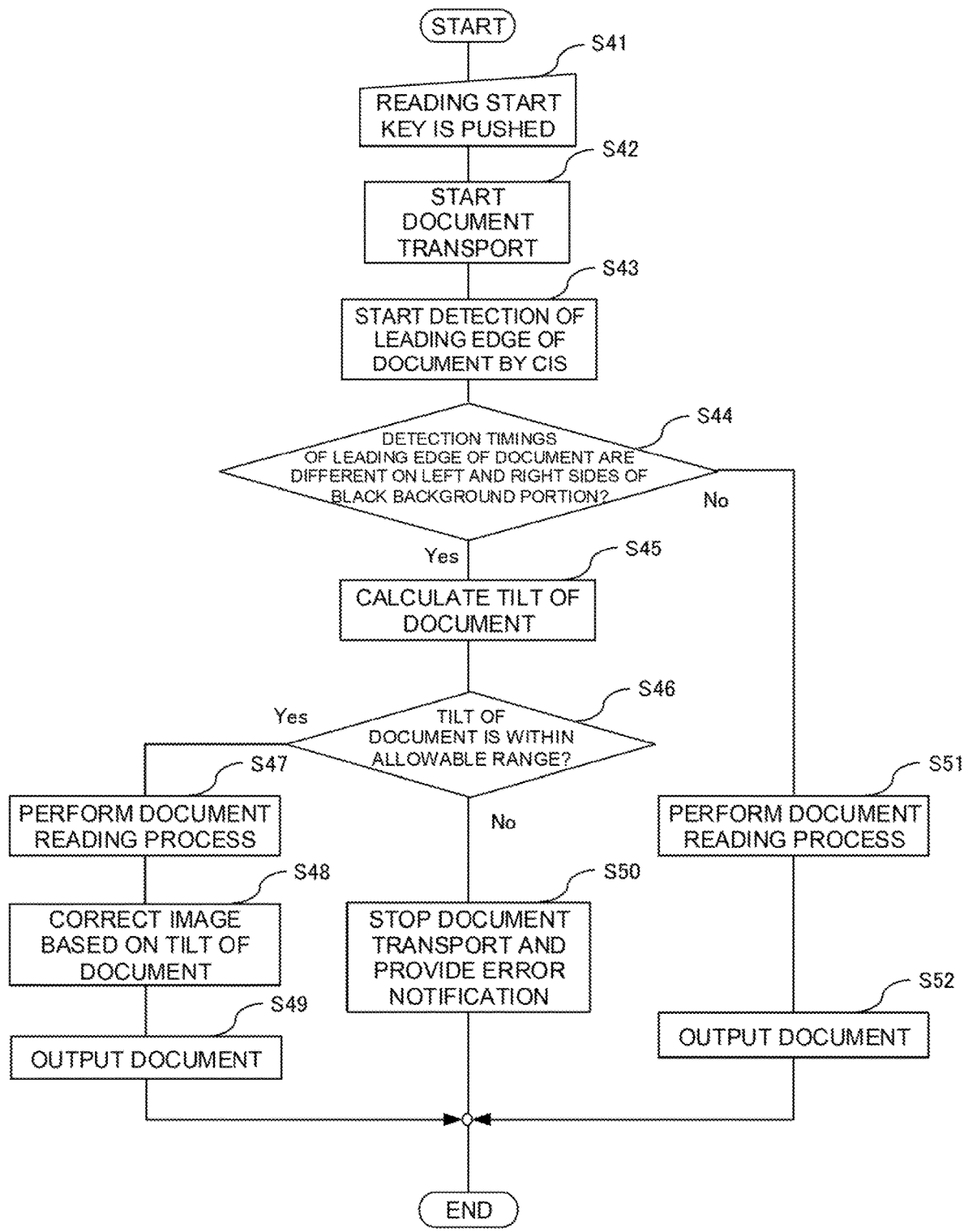

IMAGE READING DEVICE AND IMAGE FORMING APPARATUS INCLUDING IMAGE READING DEVICE

BACKGROUND OF THE INVENTION

Field of the Invention

The present invention relates to an image reading device and an image forming apparatus including the image reading device, more specifically, to an image reading device having an automatic document feeding function and an image forming apparatus including the image reading device.

Description of the Background Art

Some multifunction peripherals having image reading functions are known to be equipped with automatic document feeders (ADF).

Among image reading devices having such automatic document feeding functions, some models have been developed that can read small cards, such as a business card, in addition to regular documents, such as A4 and B5 size documents.

Such a known image reading device including an ADF for reading regular documents and for reading cards and thick documents is disclosed in, for example, Japanese Patent No. 5274522 and Japanese Unexamined Patent Publication No. 2015-164292. When a regular document is to be read, the document to be read is loaded on a lower tray of the ADF. After the document has been read, the read document passes through a bent transport path, is inverted 180 degrees, and is output to an output tray disposed above the lower tray. When a card or a thick document is to be read, the document is loaded on the lower tray, directly transported without inversion after reading, and output to a dedicated output tray.

There is disclosed an image reading device including an ADF that reads a card, a thick document, and a regular document. When a regular document is to be read, the document to be read is loaded on an upper tray of the ADF and read. After the document has been read, the read document passes through a bent transport path, is inverted 180 degrees, and is output to a lower output tray disposed below the upper tray. When a card or a thick document is to be read, a dedicated document feeding tray is disposed straight in front of the lower output tray and the document is output to the lower output tray after reading of the document.

However, a conventional image reading device that scans business cards and cards using an existing ADF requires a transport roller, a motor, a gear, etc., for transporting documents at a pitch corresponding to the size of the business card or card. This causes the transport mechanism to be complicated and costly.

Also, a dedicated sensor is required to prevent damage and skew of the document.

An object of the present invention, which has been conceived in view of the above circumstances, is to provide an image reading device that detect and prevent skew of a document during document transport more efficiently than in the past and an image forming apparatus including the image reading device.

SUMMARY OF THE INVENTION (1) An image reading device has a function of reading two types of documents, a first document having a predetermined first size and a second document having a second size larger than the first size. The image reading device includes an operation unit that accepts commands from a user; a document transporter that transports the first document and the second document along a predetermined transport path; a first document reader that reads the first document and generates image data, the first document reader reading a portion of the second document and generating image data for detecting tilt of the second document relative to a transport direction of the transport path; a second document reader that reads the second document and generates image data; a document tilt detector that detects tilt of the second document relative to the transport direction of the transport path based on the image data for detecting the tilt of the second document; and a controller. The controller causes the first document reader to read the first document and generate image data when the operation unit accepts a command to read the first document. The controller causes the first document reader to read a portion of the second document and generate image data for detecting tilt of the second document when the operation unit accepts a command to read the second document. The controller causes the document tilt detector to detect tilt of the second document relative to the transport direction of the transport path based on the image data for detecting tilt of the second document. The controller causes the document transporter to stop transport of the second document when the document tilt detector detects tilt of the second document. The controller causes the second document reader to read the second document and generate image data when the document tilt detector detects no tilt of the second document.

Another aspect of the invention provides an image forming apparatus including the image reading device and an image forming unit that forms an image on the basis of image data read by the first document reader or the second document reader.

In the present invention, the term "image reading device" refers to a device such as a scanner that reads a document and acquires image data.

The terms "first document having a first size" and "second document having a second size larger than the first size" respectively refer to, for example, a card, such as a business card, and a document sheet, such as an A4- or B5-size sheet, having a size larger than the size of the card.

The term "image forming apparatus" refers to an apparatus that forms and outputs an image, such as a copier or a multifunction device that has a copy function (e.g., a printer that forms a toner image through an electrophotographic scheme), or a multifunction peripheral (MFP) that has functions besides the copy function.

In the first embodiment, a "document transporter" according to the present invention is realized by a transporter 112. A "first document reader" according to the present invention is realized by a reader 111. A "second document reader" according the present invention is realized by a business card/card reader 113.

The present invention realizes an image reading device that detect and prevent skew of a document during document transport more efficiently than in the past and an image forming apparatus including the image reading device.

Preferred modes of the present invention will be described in the following.

(2) In the image reading device according to an aspect of the invention, the transport path may include a first transport path and a second transport path connected to the first transport path. The first document reader may be disposed in the first transport path. The second document reader may be disposed in the second transport path. The controller may cause the document transporter to transport the first document along the first transport path when the operation unit accepts an instruction to read the first document and causes the first document reader to read the first document and generate image data. The controller may cause the document transporter to transport the second document along the first transport path when the operation unit accepts an instruction to read the second document and causes the first document reader to read a predetermined portion of the second document and generate image data for detecting tilt of the second document. The controller may cause the document tilt detector to detect tilt of the second document relative to a transport direction of the first transport path based on the image data for detecting tilt of the second document. The controller may cause the document transporter to stop transport of the second document when the document tilt detector detects tilt of the second document. The controller may cause the document transporter to transport the second document along the second transport path when the document tilt detector detects no tilt of the second document and causes the second document reader to read the second document and generate image data.

In this way, the first document reader can read a predetermined portion of the second document before the second document reaches the second document reader and detect the tilt of the second document. This realizes an image reading device that detects and prevents skew of a document during document transport more efficiently than in the past.

(3) In the image reading device according to an aspect of the invention, the document tilt detector may detect whether or not the second document tilts relative to a transport direction of the first transport path based on image data of a transport-direction leading edge portion of the second document read by the first document reader within a predetermined time.

In this way, the tilt of the second document can be detected on the basis of the image data on the edge portion of the second document read by the first document reader within a predetermined time. Therefore, the entire second document does not have be to read. This realizes an image reading device that detects and prevents skew of a document during document transport more efficiently than in the past.

(4) The image reading device according to an aspect of the invention may further include an image corrector that corrects the image data read by the second document reader. The controller may cause the document tilt detector to detect a tilt angle of the second document relative to a transport direction of the first transport path based on the image data for detecting tilt of the second document. The controller may cause the document transporter to stop the transport of the second document when the document tilt detector detects tilt of the second document and determines that a tilt angle of the second document is larger than a predetermined reference tilt angle. When the tilt angle of the second document is smaller than or equal to the reference tilt angle, the controller may cause the image corrector to correct the image data read by the second document reader based on the tilt angle.

In this way, when the document tilt detector detects tilt of the second document and determines that the tilt angle of the second document is smaller than or equal to a reference tilt angle, the image data read by the second document reader is corrected on the basis of the tilt angle. This realizes an image reading device that detects and prevents skew of a document during document transport more efficiently than in the past.

(5) The image reading device according to an aspect of the invention may further include a document feed tray on which the document is loaded; a first document output tray connected to the first transport path and output the first document; and a second document output tray connected to the second transport path and output the second document. The first transport path may include a path that does not bend for transporting the first document and the second document from the document feeding tray to the first document output tray. The second document transport path may include a path that bends for transporting the second document from the first transport path to the second document output tray.

In this way, even in the case of a long and curved second transport path, the tilt of the second document can be detected when the second document is transported from the document feeder tray to the first transport path. This realizes an image reading device that detects and prevents skew of a document during document transport more efficiently than in the past.

BRIEF DESCRIPTION OF THE DRAWINGS

FIG. 19 is a flowchart illustrating example document reading processing by the digital multifunction peripheral according to the third embodiment of the present invention;

FIG. 20 is an explanatory diagram illustrating a state in which a document is loaded on the tray of the ADF of a digital multifunction peripheral according to a fourth embodiment of the present invention;

FIG. 23 is a flowchart illustrating example document reading processing the digital multifunction peripheral according to the fourth embodiment of the present invention.

DESCRIPTION OF THE PREFERRED EMBODIMENTS

The present invention will now be described in detail with reference to the accompanying drawings. Note that the following descriptions are examples in all respects, and should not be construed as limiting the present invention.

First Embodiment

A schematic configuration of a digital multifunction peripheral 1, which is an embodiment of an image forming apparatus 1 including an image reading device 2 according to the present invention, will now be described with reference to FIGS. 1 to 4.

Figure 1:
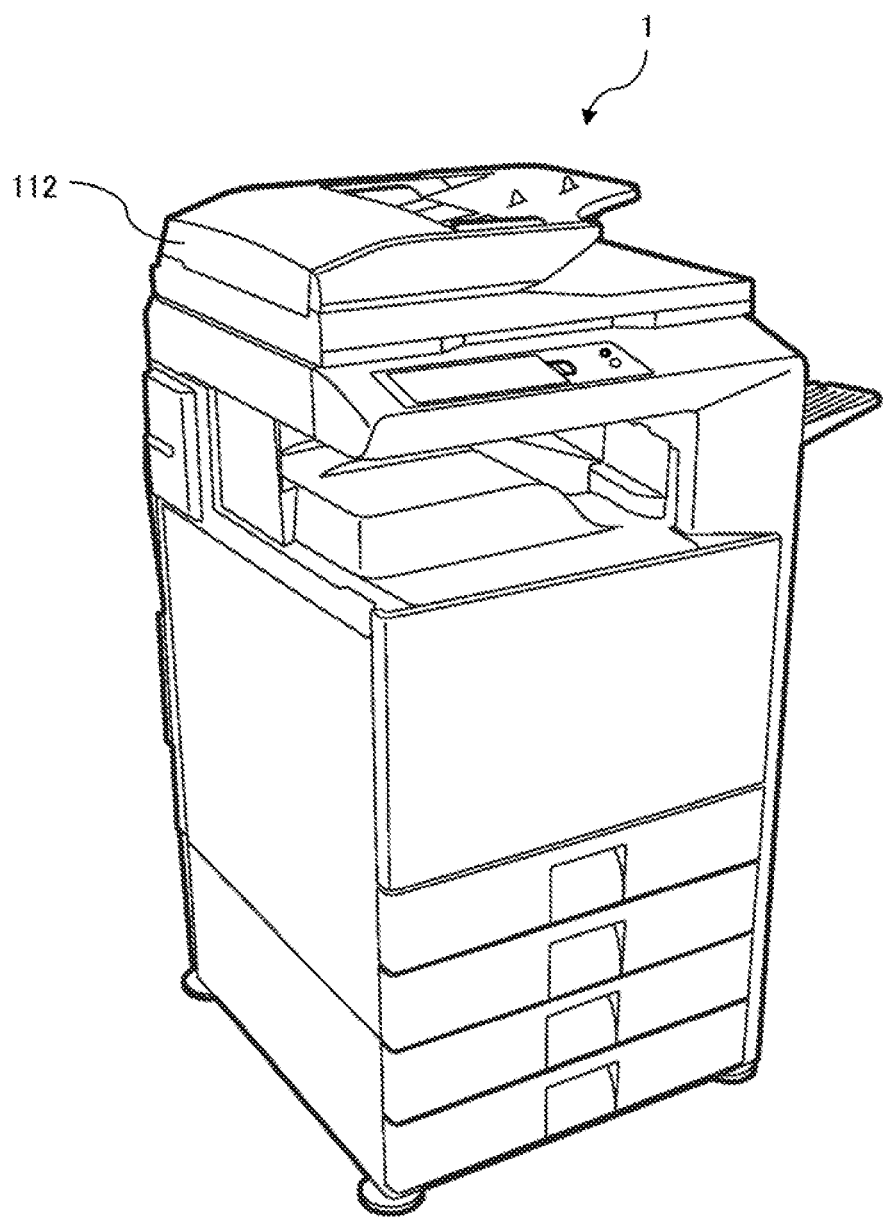
FIG. 1 is an external perspective view of a digital multifunction peripheral including an image reading device according to the present invention.
Figure 2:
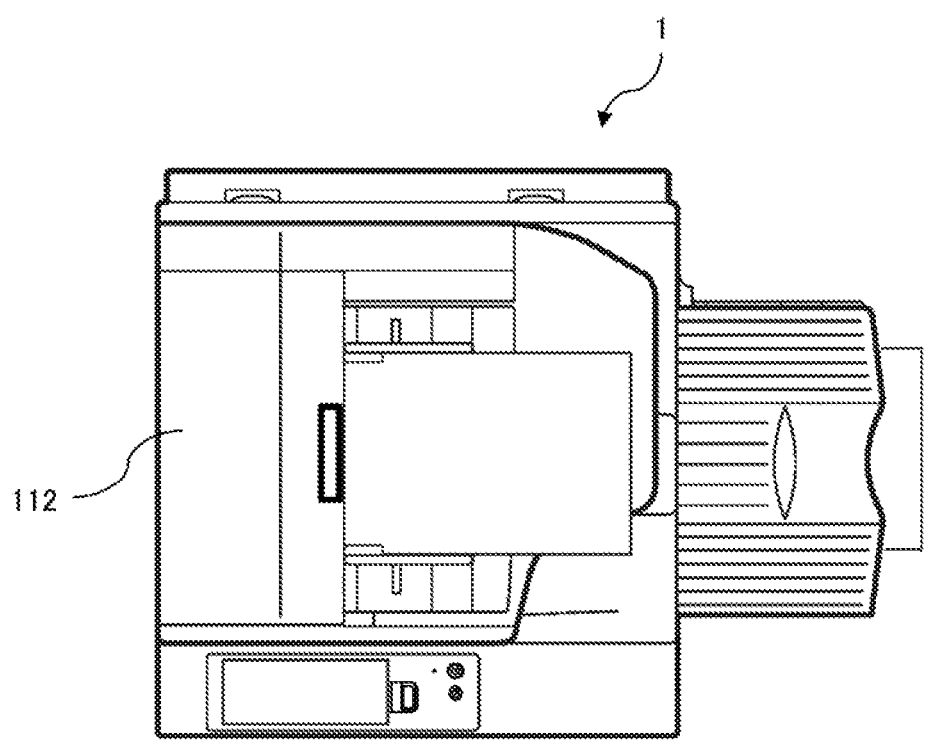
FIG. 2 is a plan view of the digital multifunction peripheral illustrated in FIG. 1.
Figure 3:
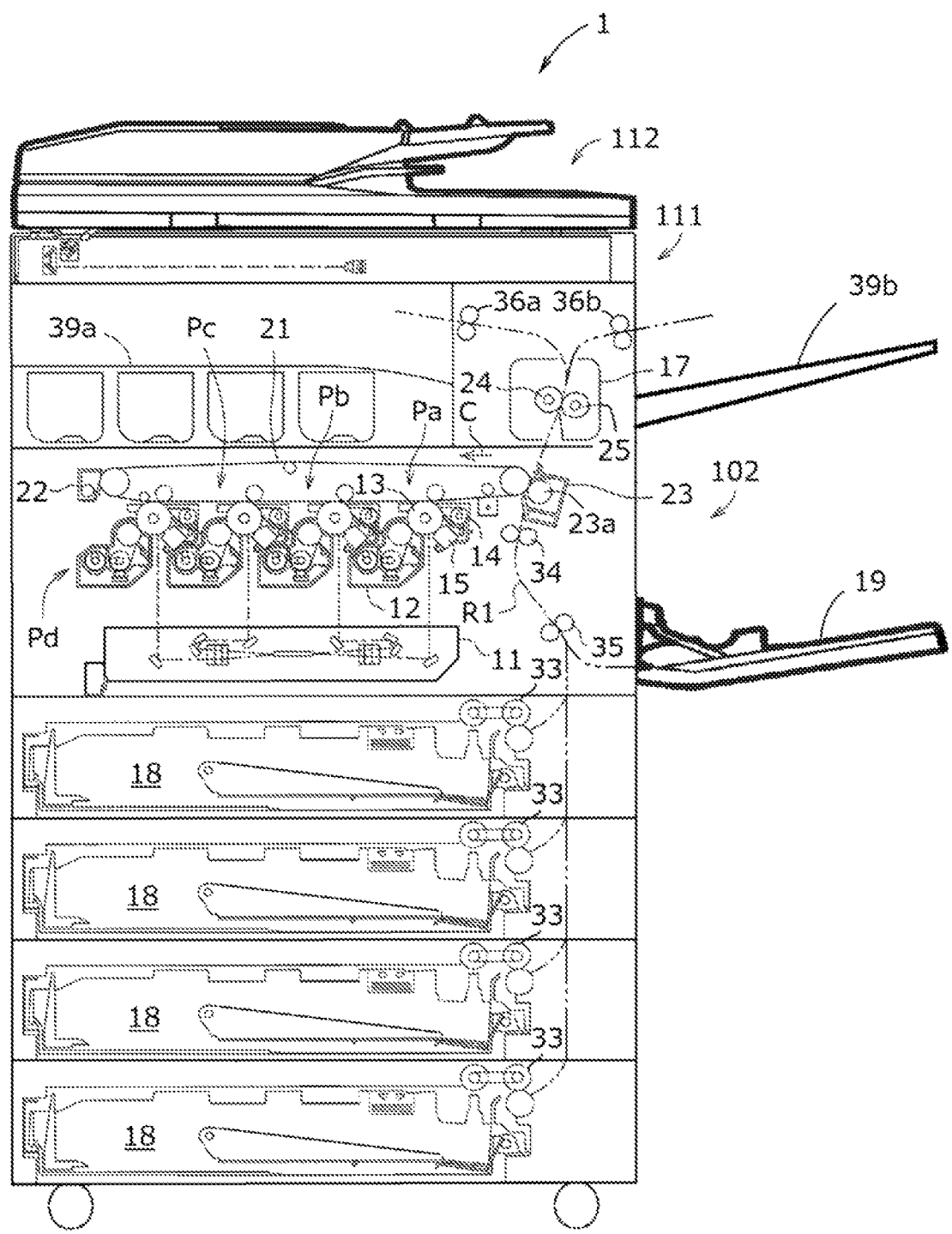
FIG. 3 is a cross-sectional view of the mechanical configuration of a main portion of the digital multifunction peripheral illustrated in FIG. 1.

FIG. 1 is an external perspective view of the digital multifunction peripheral 1 including the image reading device 2 according to the present invention. FIG. 2 is a plan view of the digital multifunction peripheral 1 illustrated in FIG. 1. FIG. 3 is a cross-sectional view of the mechanical configuration of a main portion of the digital multifunction peripheral 1 illustrated in FIG. 1.

The digital multifunction peripheral 1 is an apparatus, such as a multifunctional device or a multifunction peripheral (MFP) that digitally processes image data and has a copying function, a scanning function, and a facsimile function.

The digital multifunction peripheral 1 executes jobs of scanning, printing, and copying in response to instructions from a user received via an operation unit 103 or a communication unit 55.

Configuration of Digital Multifunction Peripheral 1

The internal configuration of the digital multifunction peripheral 1 illustrated in FIG. 3 will now be briefly described.

The digital multifunction peripheral 1 prints a color image of the colors black (K), cyan (C), magenta (M), and yellow (Y) on a printing sheet.

Therefore, the internal configuration of the digital multifunction peripheral 1 includes four developing devices 12, four photoconductive drums 13, four drum cleaners 14, and four chargers 15.

Four image stations Pa, Pb, Pc, and Pd respectively correspond to the black, cyan, magenta, and yellow colors, to form four toner images of the different colors.

Alternatively, the digital multifunction peripheral 1 may print a monochromatic image of a single color (for example, black) on a printing sheet.

A toner image is formed as follows at each of the image stations Pa, Pb, Pc, and Pd.

The drum cleaners 14 remove and collect the toners remaining on the surfaces of the photoconductive drums 13.

The chargers 15 then uniformly charge the surfaces of the corresponding photoconductive drums 13 to a predetermined potential.

An optical scanner 11 exposes the uniformly charged surfaces to form electrostatic latent images on the surfaces.

Subsequently, the developing devices 12 develop the corresponding electrostatic latent images.

In this way, the toner images of the respective colors are formed on the surfaces of the photoconductive drums 13.

An intermediate transfer belt 21 rotates in the direction of arrow C.

The toner images of the respective colors on the surfaces of the photoconductive drums 13 are sequentially transferred to the intermediate transfer belt 21 and overlaid. In this way, a color toner image is formed on the intermediate transfer belt 21.

The belt cleaner 22 removes and collects residual toner on the rotating intermediate transfer belt 21.

The printing sheet is pulled out from any one of four feeding trays 18 by a pick-up roller 33 and fed to a secondary transfer device 23 via a sheet transport path R1.

Alternatively, the printing sheet may be fed by a pick-up roller (not illustrated) from a manual feed tray 19 to the secondary transfer device 23 via the sheet transport path R1.

A register roller 34, which temporarily stops the printing sheet and aligns the leading edge of the printing sheet, is disposed in the sheet transport path R1.

A transport roller 35 that facilitates the transport of the printing sheet is also disposed in the sheet transport path R1.

A nip is formed between a transfer roller 23a of the secondary transfer device 23 and the intermediate transfer belt 21.

The register roller 34 temporarily stops the printing sheet and then transports the printing sheet to the nip in accordance with the transfer timings of the toner images.

When the printing sheet passes through the nip, the color toner image formed on the surface of the intermediate transfer belt 21 is transferred to the printing sheet.

After the printing sheet has passed through the nip, the printing sheet is heated and pressurized between a heating roller 24 and a pressure roller 25 of the fixing device 17.

By the heat and pressure, the color toner image is fixed on the printing sheet.

The printing sheet that has passed through the fixing device 17 is output to an output tray 39a or 39b through an output roller 36a or 36b.

The destination of the printing sheet is controlled by a controller 100 described below. A switching mechanism (not illustrated) switches the transport path of the printing sheet so that the printing sheet is guided to one of the output trays 39a and 39b.

The switching mechanism of the transport path of the print paper is known in the technical field of image forming apparatuses. Therefore, detailed illustration thereof is omitted.

The schematic configuration of the digital multifunction peripheral 1 will now be briefly described with reference to FIG. 4.

Figure 4:
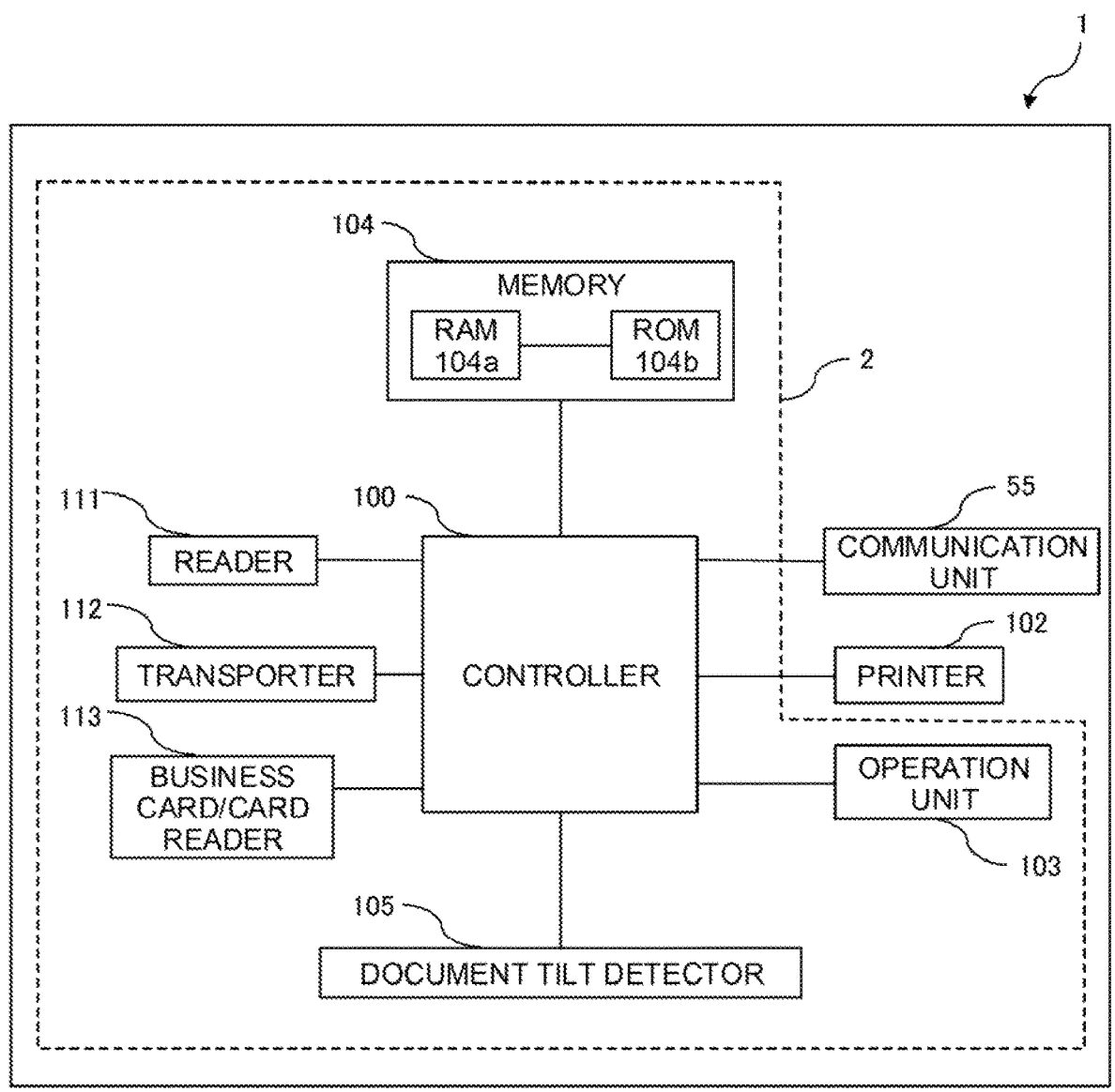
FIG. 4 is a block diagram illustrating the electrical configuration of the digital multifunction peripheral illustrated in FIG. 1.

FIG. 4 is a block diagram illustrating the electrical configuration of the digital multifunction peripheral 1 illustrated in FIG. 1.

As illustrated in FIG. 4, the digital multifunction peripheral 1 includes a communication unit 55, a controller 100, a printer 102, an operation unit 103, a memory 104, a document tilt detector 105, a reader 111, a transporter 112, and a business card/card reader 113.

In the first embodiment, the image reading device 2 includes a controller 100, an operation unit 103, a memory 104, a document tilt detector 105, a reader 111, a transporter 112, and a business card/card reader 113.

Note that, in the following description, the term "document" refers to a regular document having a size (A4, B5, etc.) larger than a business card or card.

The communication unit 55 is a circuit and firmware of a communication interface that sends and receives communication data to and from an external device, and receives an execution request for a print job from, for example, an external computer.

The controller 100 comprehensively controls the digital multifunction peripheral 1. The controller 100 includes a CPU, a RAM, a ROM, various interface circuits, etc.

The controller 100 monitors and controls all loads, such as detection of the sensors, the motor, the clutch, the fixing lamp, etc., in order to comprehensively control the operation of the digital multifunction peripheral 1.

The printer 102 prints a print image on printing sheet through an electrophotographic method.

The printer 102 includes electrical components related to the optical scanner 11, the developing devices 12, the photoconductive drums 13, the drum cleaners 14, and the chargers 15 in FIG. 3. The printer 102 further includes electrical components related to the intermediate transfer belt 21, the fixing device 17, the sheet transport path R1, the feeding trays 18, and the output trays 39a and 39b.

The operation unit 103 includes a liquid crystal display and a touch screen. The operation unit 103 displays information on the liquid crystal display and receives instructions from a user through the touch screen.

The controller 100 displays the operation and status of the digital multifunction peripheral 1 through the operation unit 103.

The memory 104 includes a random-access memory 104a (RAM) and a read-only memory 104b (ROM). The memory 104 is a non-volatile storage unit, such as a hard disk device (HDD) or a flash memory, that stores various types of data and programs.

The RAM 104a is a random-access memory that can be accessed by the controller 100. The RAM 104a provides a work memory for temporary data storage.

Recorded in the RAM 104a are, for example, the threshold value of the capacitance of the touch screen and databases of various types of images.

The ROM 104b is a read-only memory that can be accessed by the controller 100. The ROM 104b stores data necessary for program control of the controller 100.

The ROM 104b stores various types of data that is the basis for setting, for example, the image reading function and the touch panel function.

The RAM 104a and the ROM 104b are bus-connected to the controller 100. In the RAM 104a and the ROM 104b programs are stored and loaded into memory to operate the controller 100.

These are example configurations. Alternatively, the system may include multiple CPUs and boards.

The document tilt detector 105 detects the tilt (tilt angle) of the document transported by the transporter 112 relative to the traveling direction.

The reader 111 is a scanner section that optically reads a document placed on a platen.

The transporter 112 transports a document loaded on a predetermined tray to the reader 111.

The business card/card reader 113 is a scanner section that optically reads a business card or card loaded on a predetermined tray.

In the first embodiment, the business card/card reader 113 includes a contact image censor (CIS) that reads the surface of a business card or a card.

The controller 100 controls the reader 111 and the transporter 112 so that the transporter 112 transports a document. The controller 100 then causes the reader 111 to read the image of the document and store the image data corresponding to the image of the document in the memory 104.

The controller 100 controls the printer 102, so that the printer 102 prints, on a printing sheet, the image of the document indicated by the image data in the memory 104.

The above is the outline of the configuration of the digital multifunction peripheral 1.

Problems with Conventional Automatic Document Feeding Mechanism

The problems with the conventional automatic document feeding mechanism will now be described with reference to FIGS. 5 and 6.

Figure 5:
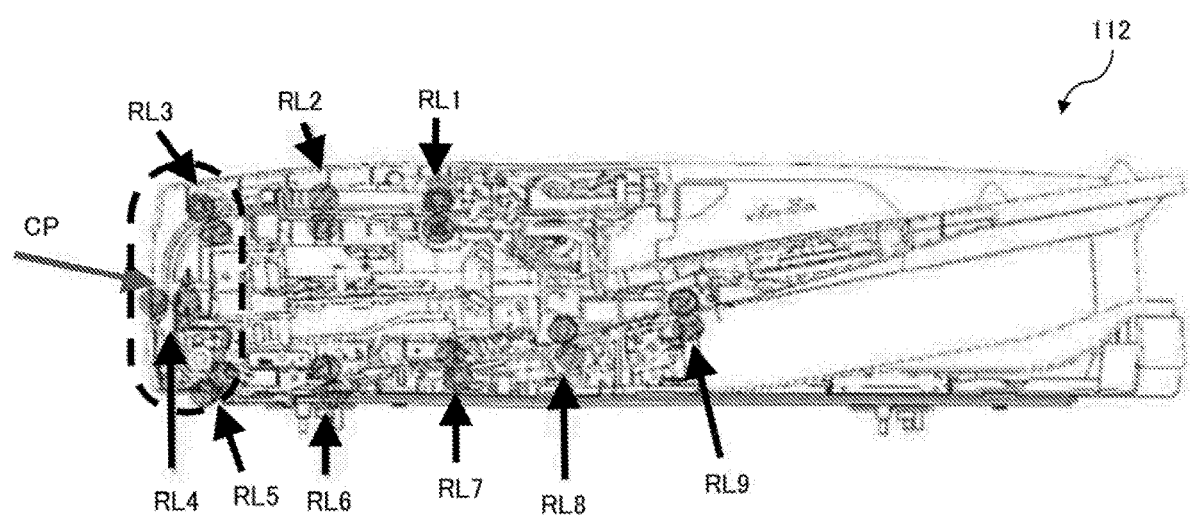
FIG. 5 is a cross-sectional diagram illustrating a problem in the automatic document feeding mechanism of a document transporting apparatus of a known digital multifunction peripheral.
Figure 6:
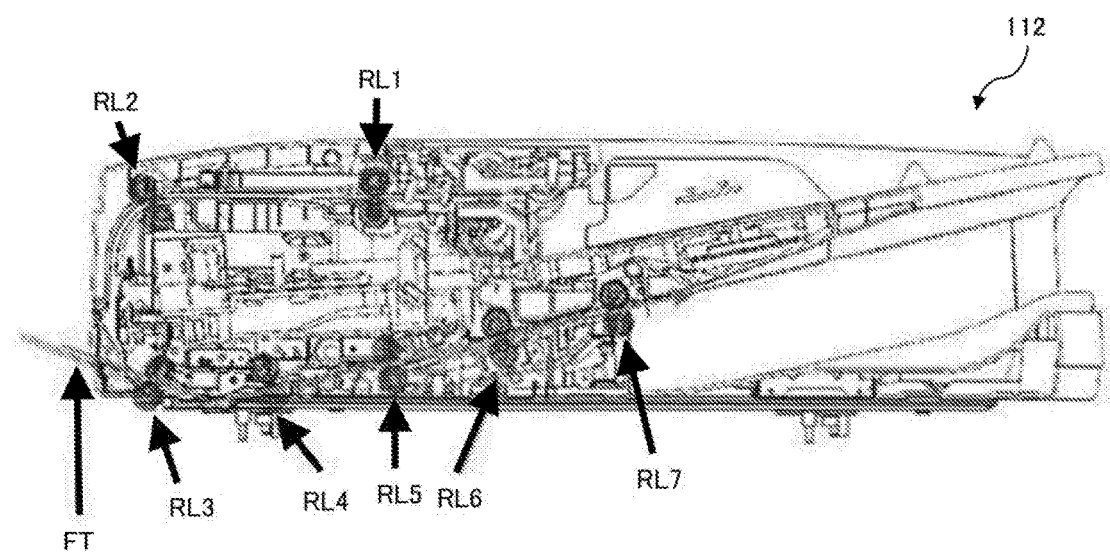
FIG. 6 is a cross-sectional diagram illustrating a problem in the automatic document feeding mechanism of a document feeding device of a known digital multifunction peripheral.

FIGS. 5 and 6 are cross-sectional diagrams illustrating the problems with the automatic document feeding mechanism of the transporter 112 of a known digital multifunction peripheral 1.

For a conventional automatic document feeding mechanism to transport a sheet having a size of a business card or card, transport rollers RL1 to RL9 must be disposed in a transport path at a short pitch corresponding to the size of the business card or card, as illustrated in FIG. 5.

This causes the transport mechanism including the arrangement of the drive gears and the motor to be complicated.

When a thick sheet, such as heavy paper, is transported through the corner portion CP (the area surrounded by the dotted line in FIG. 5) where the curvature of the transport path is large, the thick sheet may be damaged and cause a failure of the transporter 112.

For the transport of a thick sheet, such as heavy paper, a transport path having a small curvature, i.e., a transport path provided with transport rollers RL3 to RL7, may extend from a sheet feeding tray FT so that the thick sheet passing is read while passing through the transport path, as illustrated in FIG. 6. Such a configuration, however, requires the dedicated sheet feeding tray FT.

In such a case, compatibility with the transport path of a regular sheet must be achieved. Thus, the transport mechanism becomes complicated.

Schematic Configuration of Business Card/Card Reader 113 of Digital Multifunction Peripheral 1 According to First Embodiment of Invention The schematic configuration of the business card/card reader 113 of the transporter 112 of the digital multifunction peripheral 1 according to the first embodiment of the present invention will now be described with reference to FIGS. 7 and 8.

Figure 7:
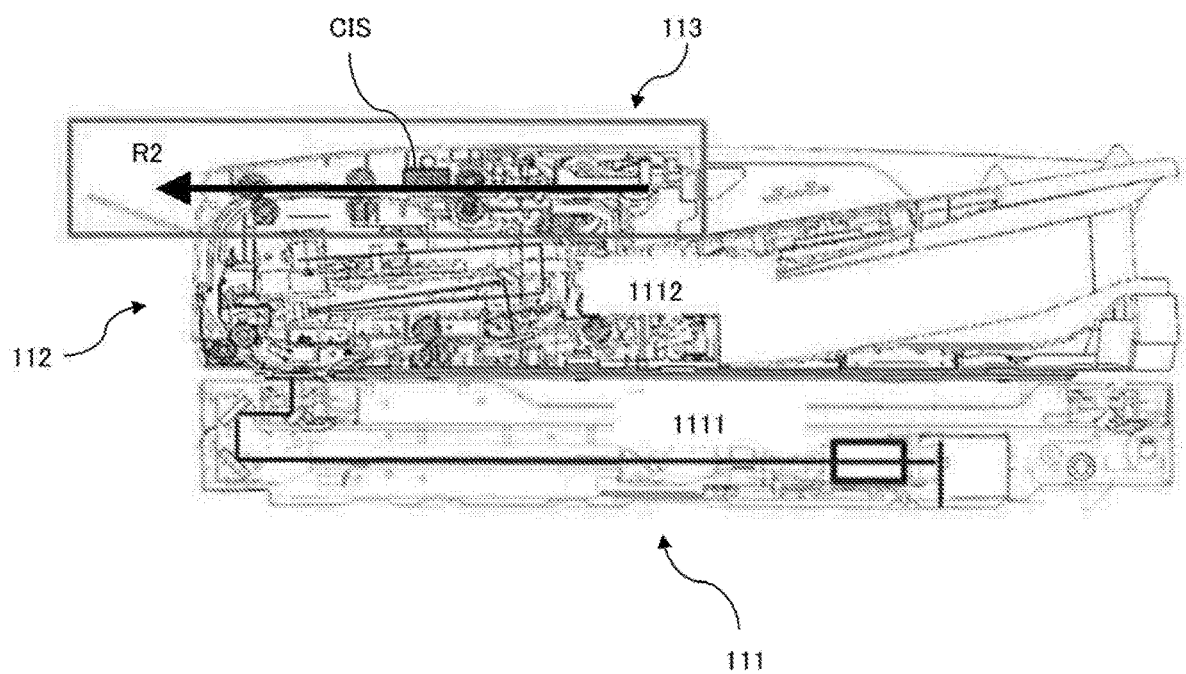
FIG. 7 is a cross-sectional diagram illustrating a schematic configuration of a business card/card reader of the digital multifunction peripheral illustrated in FIG. 1.

FIG. 7 is a cross-sectional diagram illustrating the schematic configuration of the business card/card reader 113 of the digital multifunction peripheral 1 illustrated in FIG. 1.

As illustrated in FIG. 7, the digital multifunction peripheral 1 according to the first embodiment of the present invention includes a reader 111, a transporter 112, and a business card/card reader 113.

The reader 111 includes a document front-face reader 1111 and a document back-face reader 1112, which respectively read the front and back faces of a document.

The business card/card reader 113 includes a contact image censor (CIS) that reads the front face of a business card or a card along a document transport path R2.

Skew Detection Process for Document Reading by Digital Multifunction Peripheral 1 According to First Embodiment of Invention A skew detection process for document reading by the digital multifunction peripheral 1 according to the first embodiment of the present invention will now be explained with reference to FIGS. 8 to 11.

Figure 8:
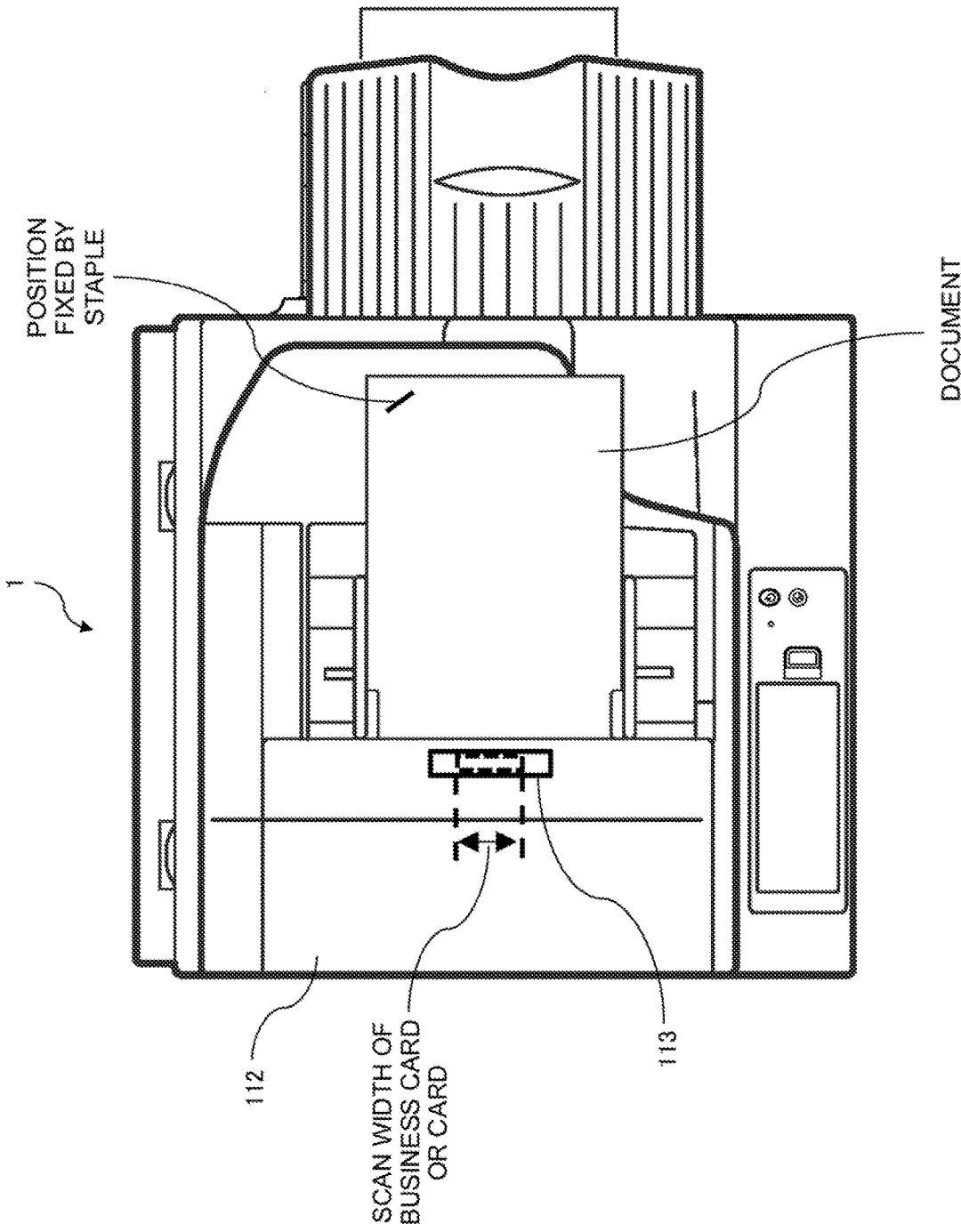
FIG. 8 is an explanatory diagram illustrating a state in which a document is loaded on the tray of the ADF of the digital multifunction peripheral illustrated in FIG. 1.

FIG. 8 is an explanatory diagram illustrating a state in which a document is loaded on the tray of the ADF of the digital multifunction peripheral 1 illustrated in FIG. 1.

As illustrated in FIG. 8, the business card/card reader 113 is disposed above the transporter 112.

The scan width of the entire sensor of the business card/card reader 113 should be larger than the length of the short or long side of a business card or card.

Alternatively, the scan width may be sufficient for reading an A4-size document in the direction of the short side, which is the same for the reader 111.

Figure 9A:
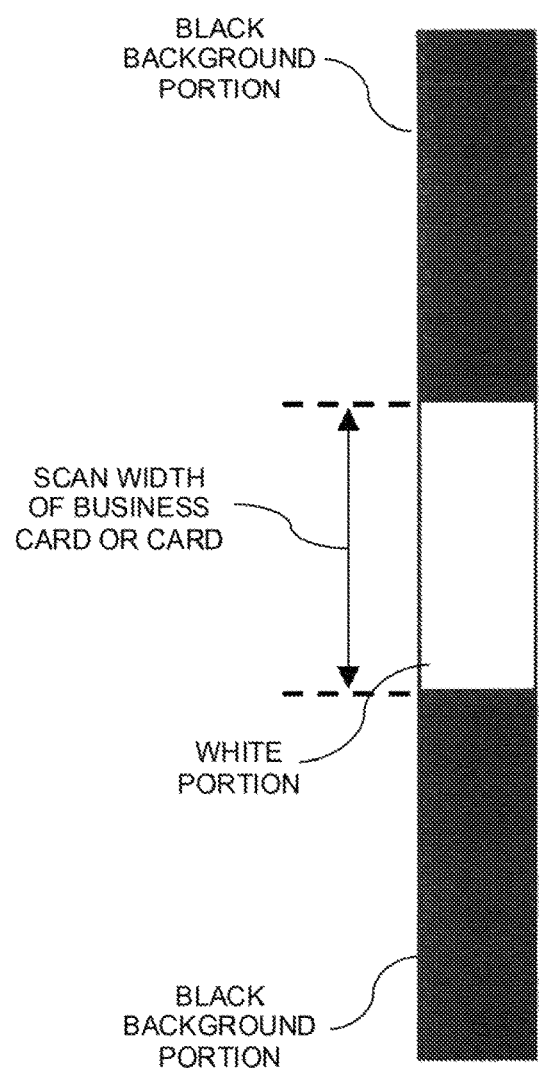
FIGS. 9A and 9B are explanatory diagrams illustrating an example pattern for skew detection disposed on a face opposing a contact image sensor (CIS) of a business card/card reader of the digital multifunction peripheral illustrated in FIG. 1.
Figure 9B:
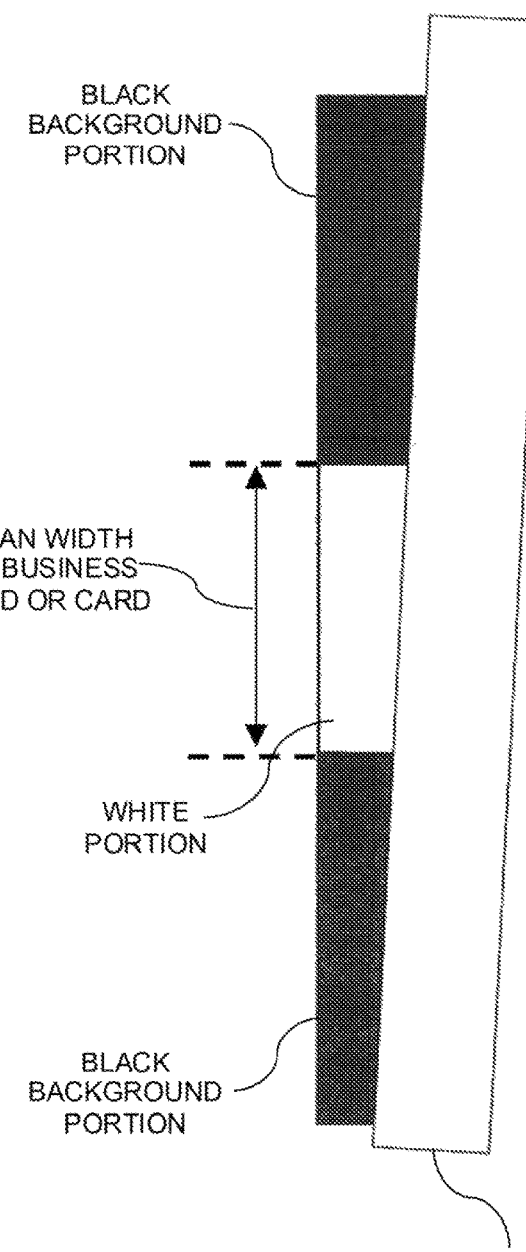
Figure 10A:
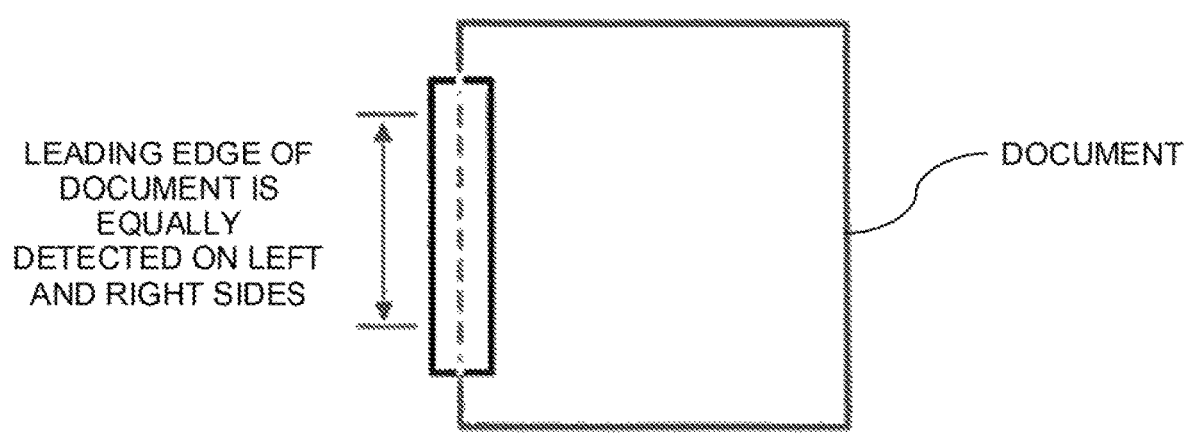
FIGS. 10A and 10B are explanatory diagrams illustrating the positional relation between the CIS of the business card/card reader of the digital multifunction peripheral illustrated in FIG. 1 and the document being transported.
Figure 10B:
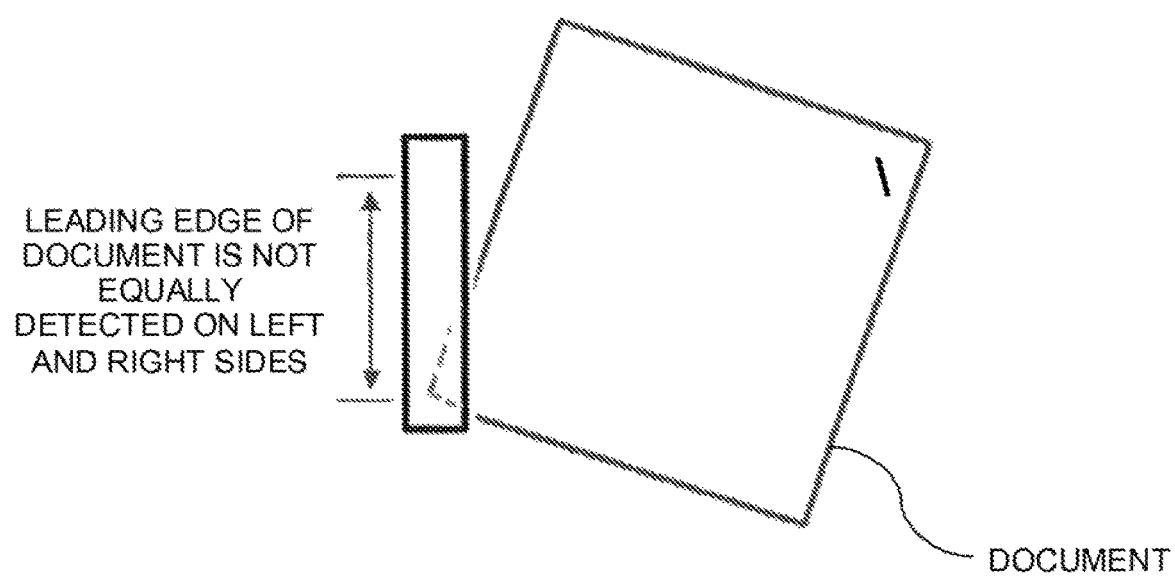

FIGS. 9A and 9B are explanatory diagrams illustrating an example pattern for skew detection disposed on a face opposing the CIS of the business card/card reader 113 of the digital multifunction peripheral 1 illustrated in FIG. 1. FIGS. 10A and 10B are explanatory diagrams illustrating the positional relation between the CIS of the business card/card reader 113 of the digital multifunction peripheral 1 illustrated in FIG. 1 and a document being transported.

As illustrated in FIG. 9A, a pattern is provided on the face opposing the CIS. The pattern includes a white portion and black background portions. The white portion corresponds to the scan width of the business card or card and is colored in white. The black background portions are disposed at the two ends of the white portion and colored in black.

Alternatively, the scan width of the business card/card reader 113 may be sufficient for reading a business card or card in the direction of the short side.

In this way, the business card or card may be transported in the direction of the long side and read in the direction of the short side, and thereby the pitch of the transport rollers can be increased.

It is also possible to decrease the scan width of the sensor of the business card/card reader 113.

A decrease in the part of the scan width of the sensor of the business card/card reader 113 leads to an increase of the lengths of the black background portions at the left and right ends. This facilitates the detection of skew of a document.

Alternatively, the scan width of the business card/card reader 113 may be sufficient for reading a business card or card in the direction of the long side.

In such a case, the business card or card is read at a faster rate than in the direction of the short side.

Note that, during document reading, the CIS reads not only the white portion corresponding to the scan width of a business card or card, but also the black background portions at both ends of the white portion.

As illustrated in FIG. 10A, when the document is transported straight to the CIS without skew, the CIS detects the leading edge of the document in the two black background portions at substantially the same timing.

When the document starts to be read while a corner of the document is bound with a staple, etc., as illustrated in FIG. 8, the document may be skewed while being transported, as illustrated in FIG. 10B, and transported to CIS in the skewed state.

If the document is transported in such a skewed state, the document may not be read correctly and also may cause a paper jam.

As illustrated in FIG. 10B, when the document is transported to the CIS in a skewed state, the leading edge of the document is detected by the CIS at different timings in the left and right black background portions, as illustrated in FIG. 9B.

As illustrated in FIG. 9B, in view from the transport direction of the document, the left side of the leading edge of the document is detected by the CIS in the corresponding black background portion before the right side of the leading edge is detected.

Figure 11:
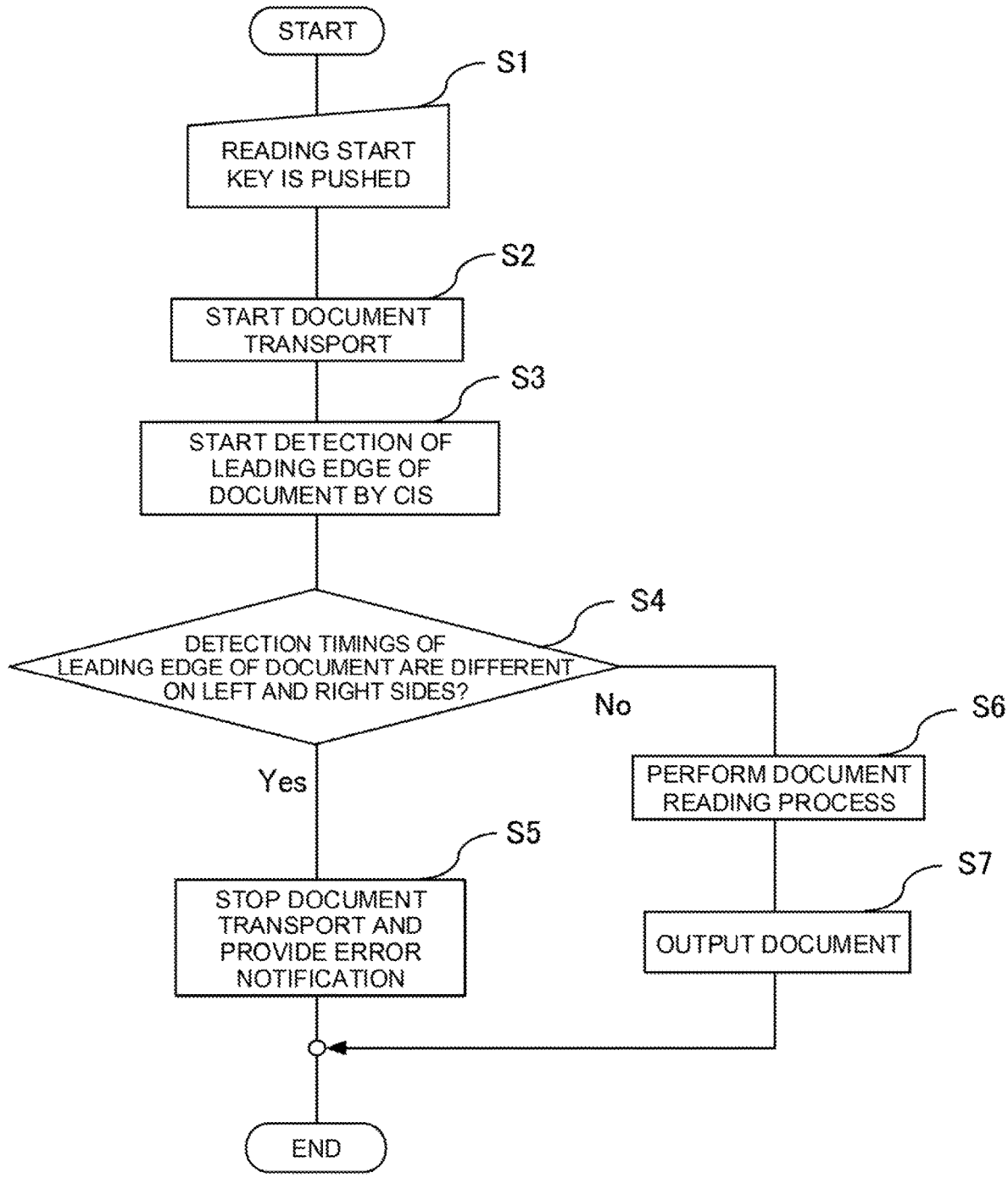
FIG. 11 is a flowchart showing example document reading processing by the digital multifunction device illustrated in FIG. 1.

FIG. 11 is a flowchart illustrating an example document reading process for the digital multifunction peripheral 1 illustrated in FIG. 1.

In step S1 of FIG. 11, if the reading start key of the operation unit 103 is pushed (step S1), in step S2, the controller 100 causes the transporter 112 to start the transport of the document (step S2).

In step S3, the controller 100 causes the CIS to start the detection of the leading edge of the document (step S3).

In the subsequent step S4, the controller 100 determines whether or not the timings of the detection of the leading edge of the document by the CIS are different on the left and right sides (step S4).

If the timings of the detection of the leading edge of the document by the CIS are different on the left and right sides (Yes in step S4), in step S5, the controller 100 stops the transport of the document and notifies the user about the error (step S5).

The controller 100 then ends the process.

If the timings of the detection of the leading edge of the document by the CIS are substantially the same on the left and right sides (No in step S4), in step S6, the controller 100 causes the reader 111 to perform the document reading process (step S6).

Note that the reading position for the detection of skew of the document is not limited to the leading edge of the document. For example, skew of the document may be detected while the document is transported, on the basis of whether the timings of the detection of the trailing edge of the document by the CIS are different on the left and right sides.

In the subsequent step S7, the controller 100 causes the transporter 112 to output the document (step S7) and ends the process.

By detecting the tilt of the document with the CIS for scanning a business card or card is this way, the digital multifunction peripheral 1 can detect and prevent skew of a document while the document is being transported more efficiently than in the past.

Second Embodiment

Skew Detection Process for Document Reading by Digital Multifunction Peripheral 1 According to Second Embodiment of Invention A skew detection process for document reading by the digital multifunction peripheral 1 according to the second embodiment of the present invention will now be explained with reference to FIGS. 12 to 15.

Note that the other configurations of the digital multifunction peripheral 1 according to the second embodiment is the same as those according to the first embodiment, so descriptions thereof will be omitted.

Figure 12:
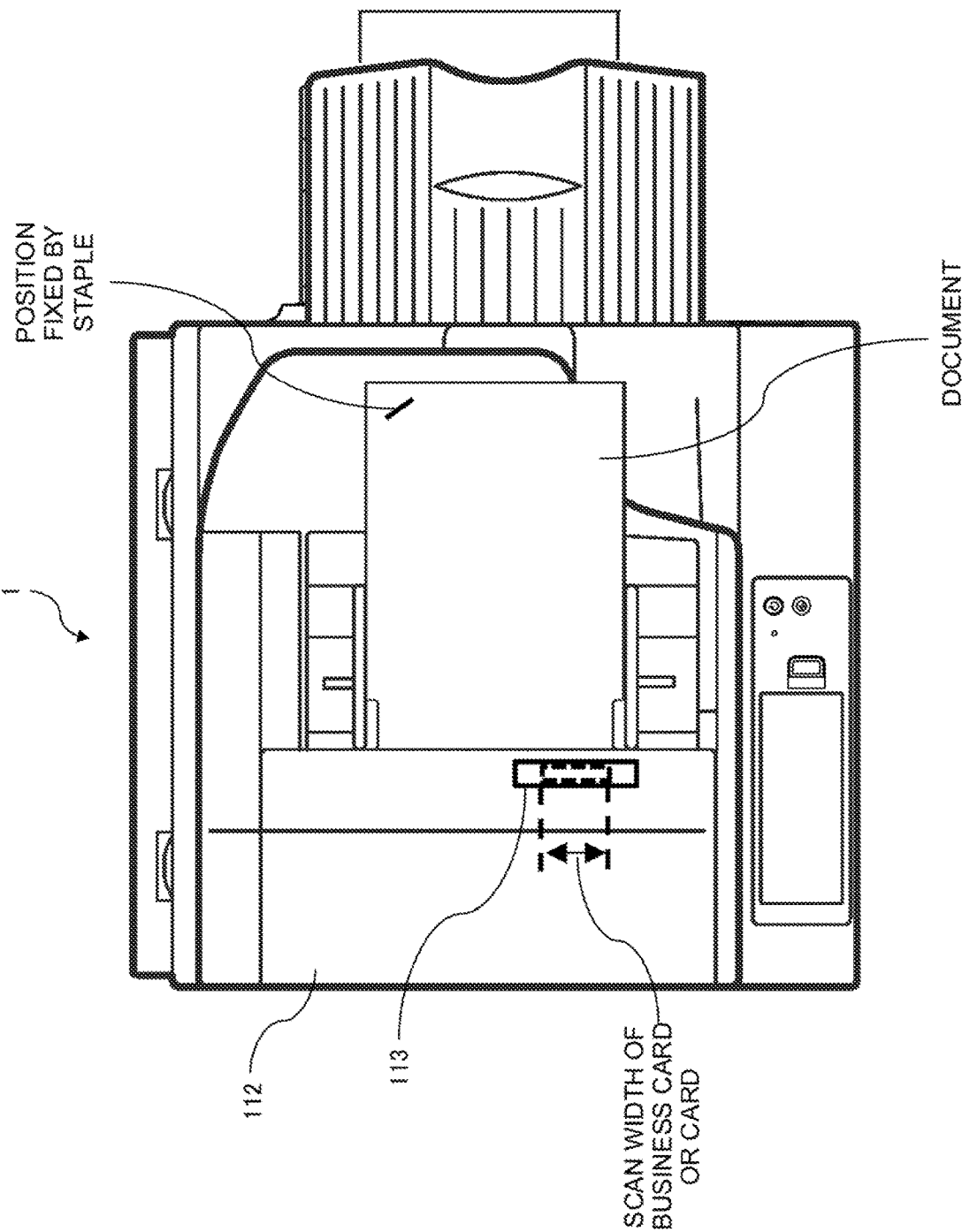
FIG. 12 is an explanatory diagram illustrating a state in which a document is loaded on the tray of the ADF of a digital multifunction peripheral according to a second embodiment of the present invention.

FIG. 12 is an explanatory diagram illustrating a state in which a document is loaded on the tray of the ADF of a digital multifunction peripheral 1 according to the second embodiment of the present invention.

As illustrated in FIG. 12, the business card/card reader 113 is disposed above the transporter 112.

The difference from the first embodiment is that the business card/card reader 113 is disposed on the left side of the transport direction of the document.

Figure 13A:
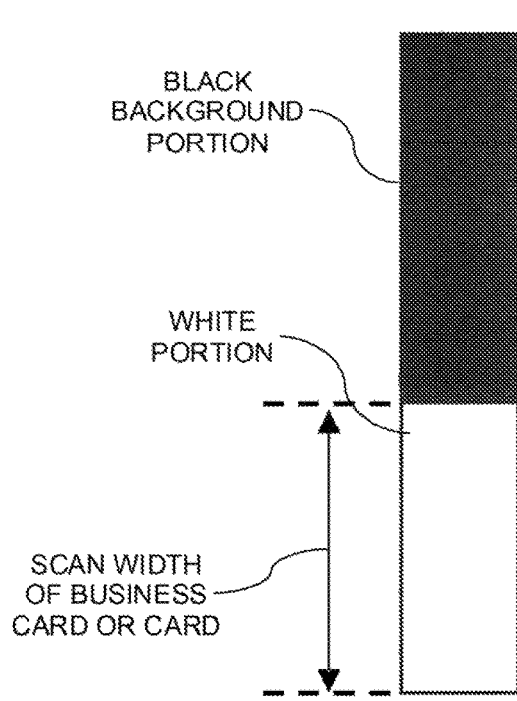
FIGS. 13A and 13B are explanatory diagrams illustrating an example pattern for skew detection disposed on a face opposing a CIS of a business card/card reader of the digital multifunction peripheral illustrated in FIG. 12.
Figure 13B:
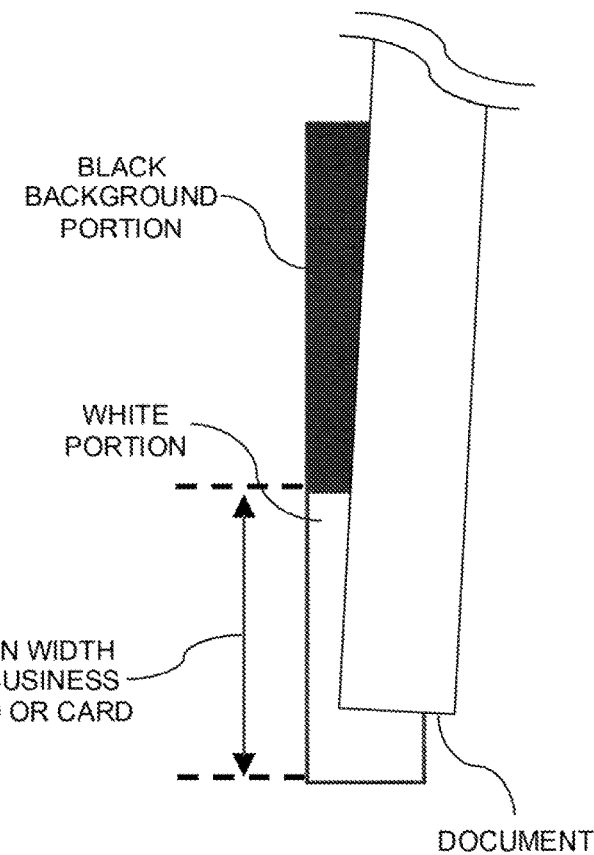

FIGS. 13A and 13B are explanatory diagrams illustrating an example pattern for skew detection disposed on a face opposing the CIS of the business card/card reader 113 of the digital multifunction peripheral 1 illustrated in FIG. 12.

As illustrated in FIG. 13A, a pattern is provided on the face opposing the CIS. The pattern includes a white portion and a black background portion. The white portion corresponds to the scan width of the business card or card and is colored in white. The black background portion is disposed on the right side of the white portion and colored in black.

Note that, during document reading, the CIS reads not only the white portion corresponding to the scan width of a business card or card, but also the black background portion on the right side of the white portion.

Figure 14A:
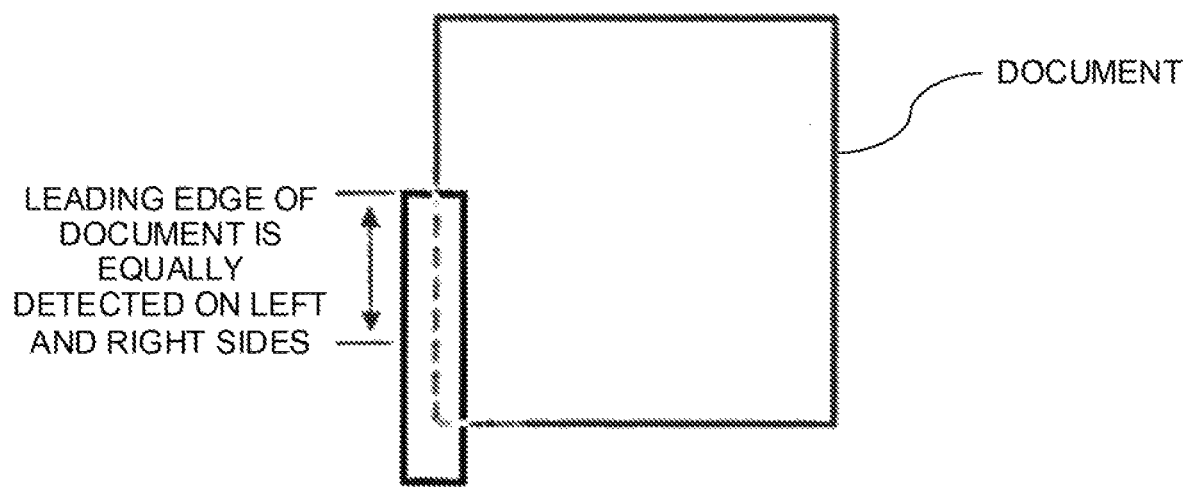
FIGS. 14A and 14B are explanatory diagrams illustrating the positional relation between the CIS of the business card/card reader of the digital multifunction peripheral according to the second embodiment of the present invention and the document being transported.
Figure 14B:
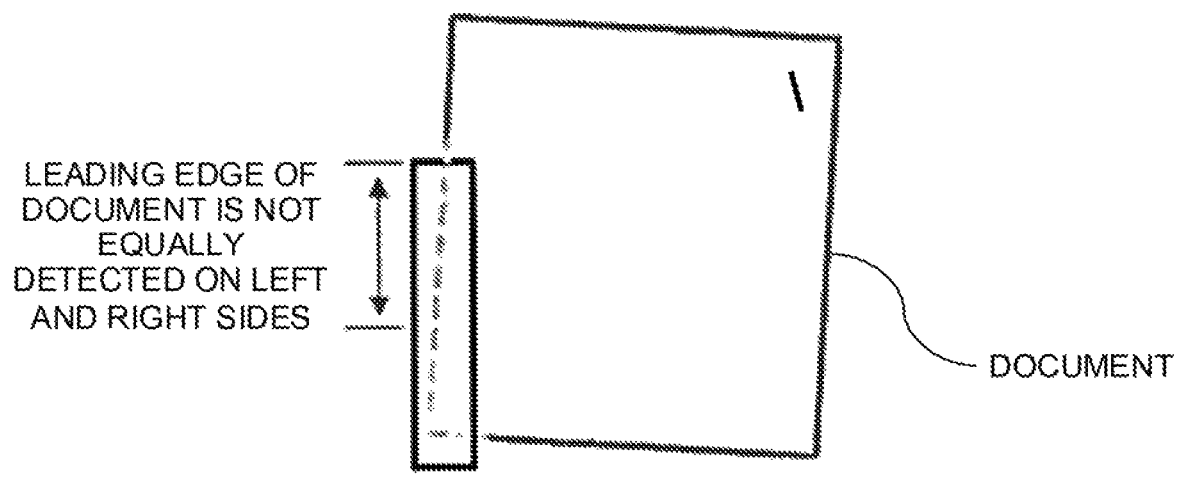

FIGS. 14A and 14B are explanatory diagrams illustrating the positional relation between the CIS of the business card/card reader 113 of the digital multifunction peripheral 1 illustrated in FIG. 1 and the transported document.

As illustrated in FIG. 14A, when the document is transported straight to the CIS without skew, the CIS detects the leading edge of the document at any two points in the black background portion at substantially the same timing.

When the document starts to be read while a corner of the document is bound with a staple, etc., as illustrated in FIG. 12, the timings of the detection of the leading edge of the document by the CIS, as illustrated in FIG. 14B, may be different at two points in the black background portion.

As illustrated in FIG. 14B, in view from the transport direction of the document, the left side of the leading edge of the document is detected by the CIS in the corresponding black background portion before the right side of the leading edge is detected.

Figure 15:
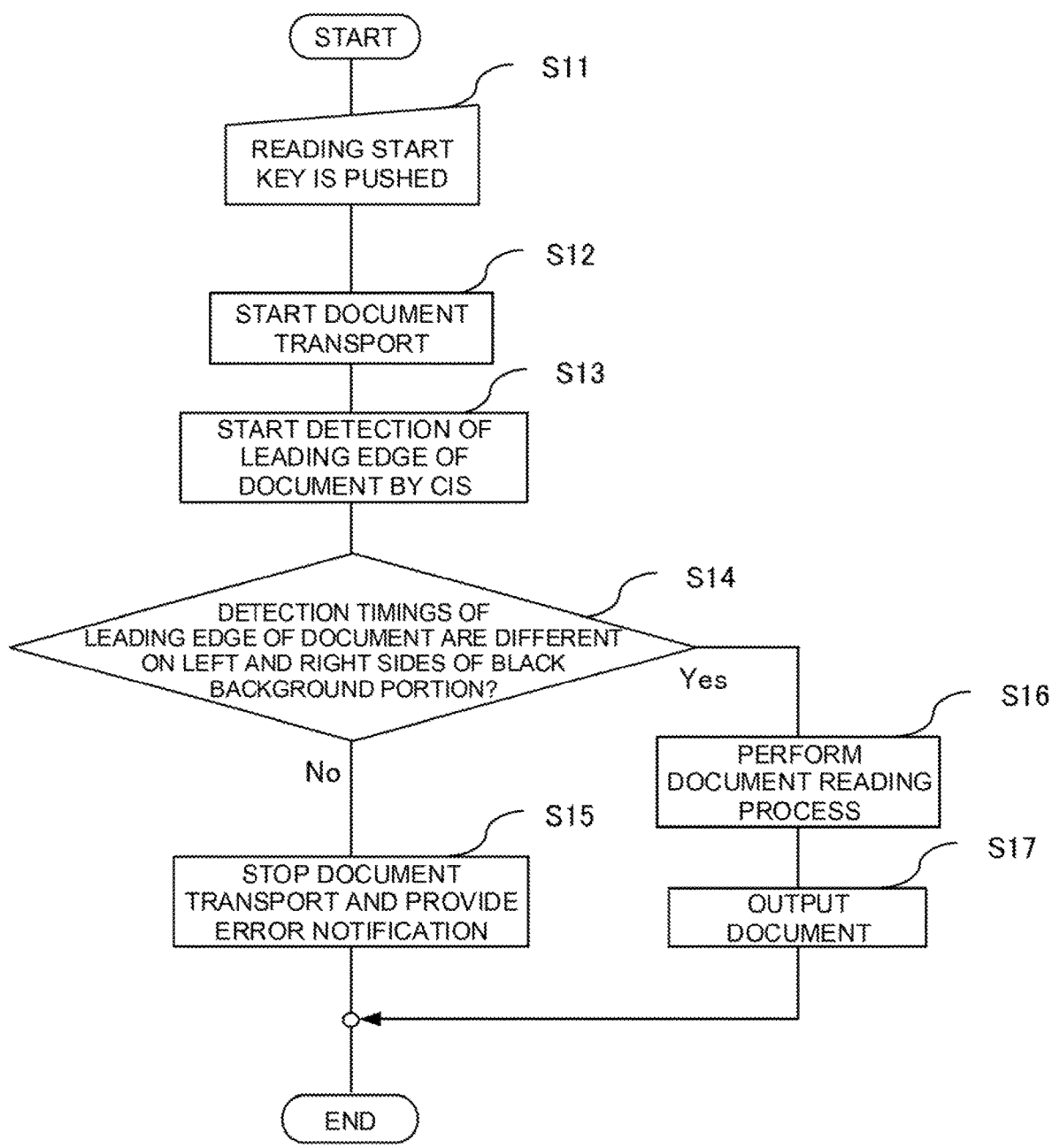
FIG. 15 is a flowchart illustrating example document reading processing by the digital multifunction peripheral according to the second embodiment of the present invention.

FIG. 15 is a flowchart illustrating an example document reading process for the digital multifunction peripheral 1 according to the second embodiment of the present invention.

Note that steps S11 to S13 and S15 to S17 in FIG. 15 corresponds to steps S1 to S3 and S5 to S7 in FIG. 11, so the descriptions thereof are omitted.

Here, the determination in step S14 in FIG. 15, which is not included in the first embodiment, will be explained.

In step S13 in FIG. 15, the CIS starts the detection of the leading edge of the document (step S13). In the subsequent step S14, the controller 100 determines whether or not the timings of the detection of the leading edge of the document by the CIS in the black background portion are different on the left and right sides (step S14).

If the timings of the detection of the leading edge of the document by the CIS are different on the left and right sides (Yes in step S14), in step S15, the controller 100 stops the transport of the document and notifies the user about the error (step S15).

The controller 100 then ends the process.

If the timings of the detection of the leading edge of the document by the CIS are substantially the same on the left and right sides (if the timings are within a predetermined allowable range) (No in step S14), in step S16, the controller 100 causes the reader 111 to perform the document reading process (step S16).

By detecting the tilt of the document with the CIS for scanning a business card or card is this way, the digital multifunction peripheral 1 can detect and prevent skew of a document while the document is being transported more efficiently than in the past.

The second embodiment of the present invention is particularly advantageous in that the detection time can be reduced depending on the position of the document fixed by a staple, etc., in comparison with the first embodiment.

Since the upper left area of the document face is often stapled, the business card/card reader 113 may be disposed on the left side of the document transport direction. In this way, early detection of the left edge can be achieved, and the transport of the document can be stopped.

It is also advantageous to disposed the business card/card reader 113 on the front side because the transported business card will be output to the front. In this way, the user can easily see and reach for the business card.

Third Embodiment

Skew Detection Process for Document Reading by Digital Multifunction Peripheral 1 According to Third Embodiment of Invention A skew detection process for document reading by the digital multifunction peripheral 1 according to the third embodiment of the present invention will now be explained with reference to FIGS. 16, 17, 18 and 19.

Note that the other configurations of the digital multifunction peripheral 1 according to the third embodiment is the same as those according to the first embodiment, so descriptions thereof will be omitted.

Figure 16:
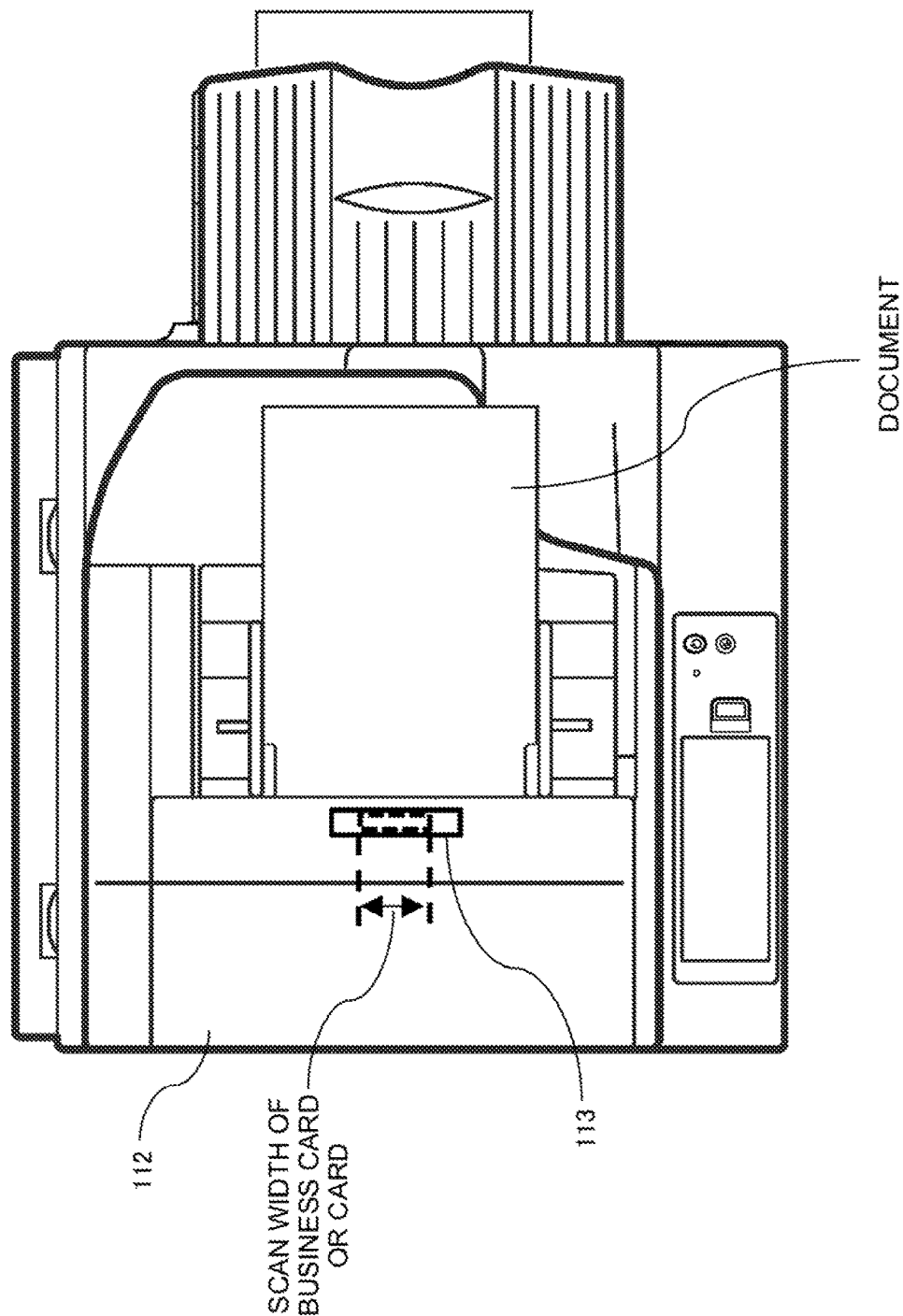
FIG. 16 is an explanatory diagram illustrating a state in which a document is loaded on the tray of the ADF of a digital multifunction peripheral according to a third embodiment of the present invention.

FIG. 16 is an explanatory diagram illustrating a state in which a document is loaded on the tray of the ADF of a digital multifunction peripheral 1 of the third embodiment of the present invention.

As illustrated in FIG. 16, the business card/card reader 113 is disposed above the transporter 112.

The difference from the first embodiment is that the corners of the document are not bound by staples.

Even when the corners of the document are not bound with staples, etc., in this way, the document may be skewed during transport.

In such a case, damage to the document or failure of the transporter 112 due to a paper jam may not occur, but there is a risk of the document being read in a tilted state.

Figure 17A:
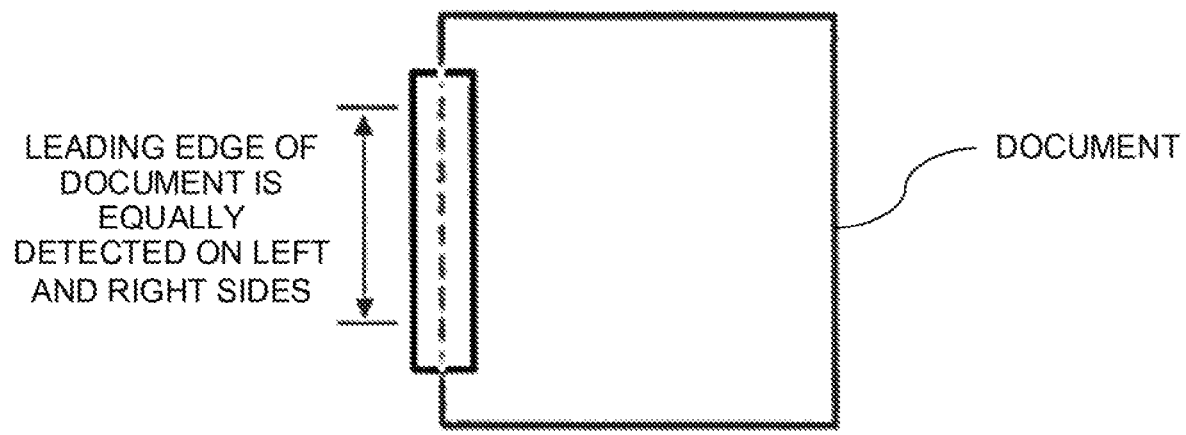
FIGS. 17A and 17B are explanatory diagrams illustrating the positional relation between the CIS of the business card/card reader of the digital multifunction peripheral according to the third embodiment of the present invention and the document being transported.
Figure 17B:
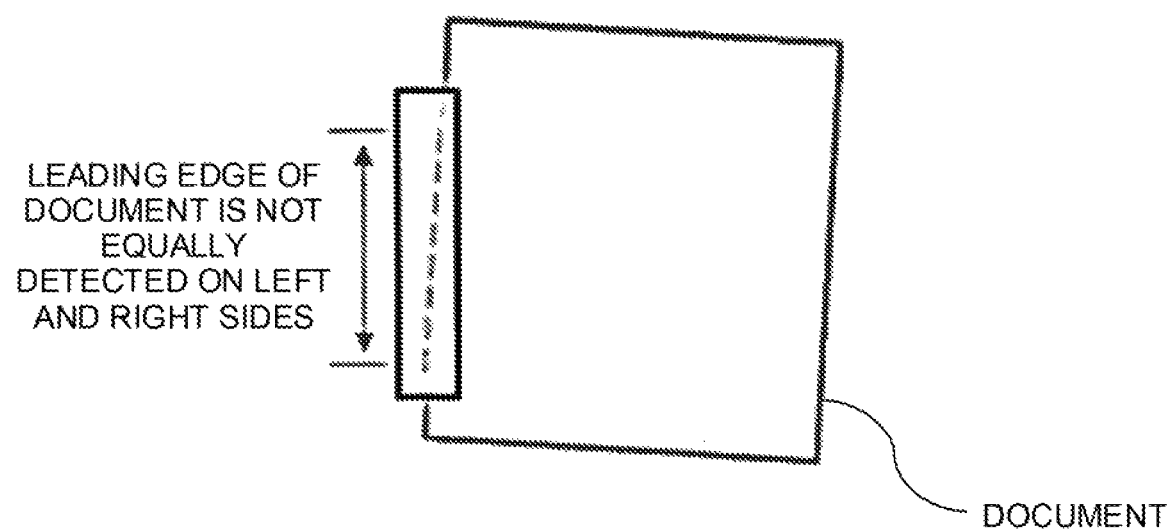

FIGS. 17A and 17B are explanatory diagrams illustrating the positional relation between the CIS of the business card/card reader 113 of the digital multifunction peripheral 1 according to the third embodiment of the present invention and the transported document.

As illustrated in FIG. 17A, when the document is transported straight to the CIS without skew, the CIS detects the leading edge of the document in the two black background portions at substantially the same timing.

As illustrated in FIG. 17B, the document may be slightly skewed during transport and transported to the CIS in a skewed state.

If the document is transported in such a skewed state, damage to the document or failure of the transporter 112 due to a paper jam may not occur, but there is a risk of the document being read in a skewed state.

Therefore, in the third embodiment, when the tilt (tilt angle) of the document is within a predetermined range, the image is corrected on the basis of the tilt (tilt angle).

Figure 18:
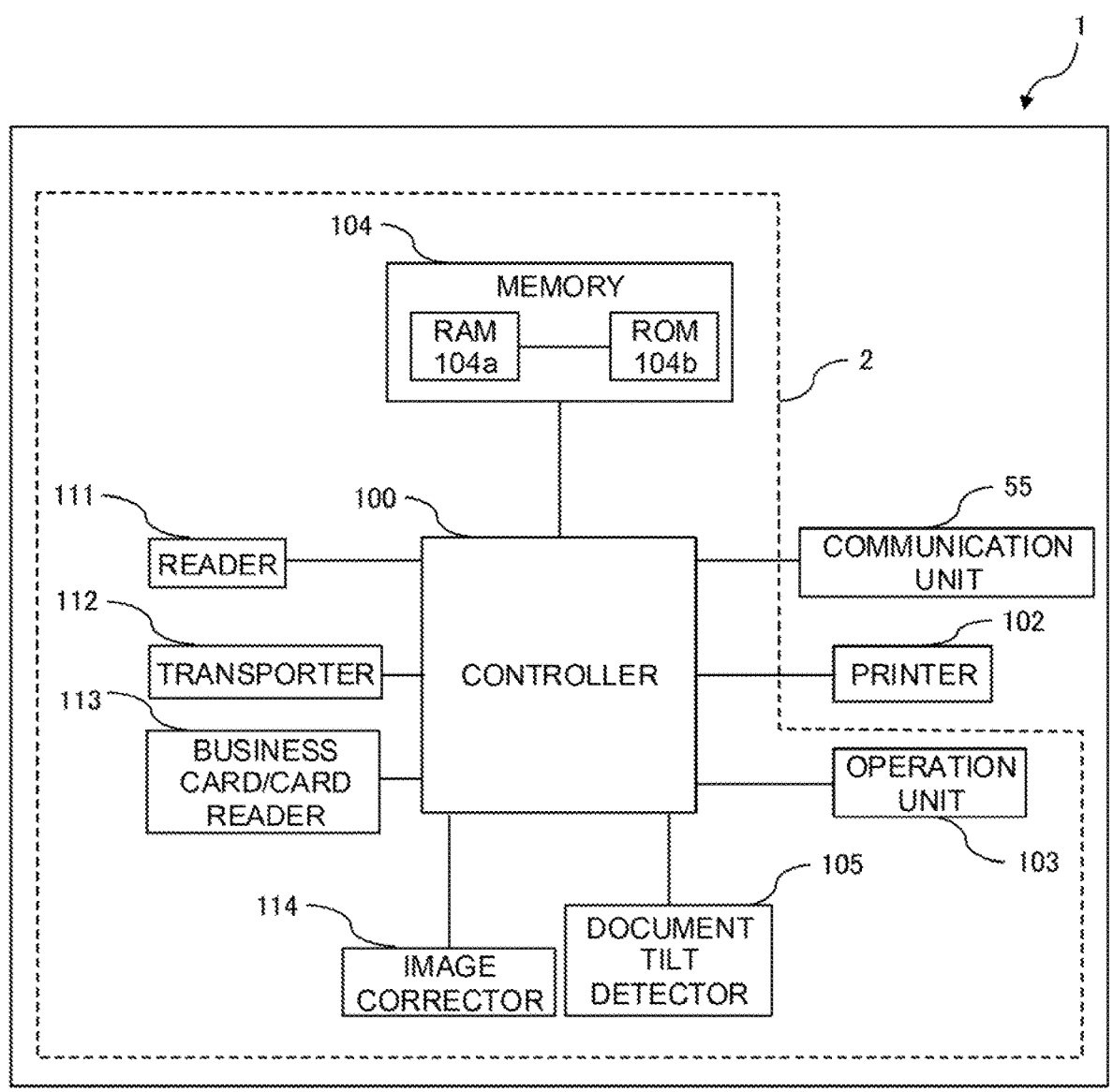
FIG. 18 is a block diagram illustrating the electrical configuration of the digital multifunction peripheral according to the third embodiment of the present invention.

FIG. 18 is a block diagram illustrating the electrical configuration of the digital multifunction peripheral 1 according to the third embodiment of the present invention.

As illustrated in FIG. 18, the digital multifunction peripheral 1 includes a communication unit 55, a controller 100, a printer 102, an operation unit 103, a memory 104, a document tilt detector 105, a reader 111, a transporter 112, and an image corrector 114.

The image corrector 114 corrects an image on the basis of the tilt (tilt angle) calculated by the document tilt detector 105.

FIG. 19 is a flowchart illustrating an example document reading process for the digital multifunction peripheral 1 according to the third embodiment of the present invention.

Note that steps S21 to S24 and S30 to S32 in FIG. 19 corresponds to steps S1 to S7 in FIG. 11, so the descriptions thereof are omitted.

Here, the determination in steps S25 to S29 in FIG. 19, which is not included in the first embodiment, will be explained.

In step S24 in FIG. 19, if the timings of the detection of the leading edge of the document by the CIS are different on the left and right sides (Yes in step S24), in step S25, the controller 100 calculates the tilt (tilt angle) of the document (step S25).

In a specific calculation method, for example, the tilt (tilt angle) of the document is calculated on the basis of the time difference between the detection timings of the leading edge of the document detected in the left and right black back portions.

Alternatively, the tilt (tilt angle) of the document may be calculated on the basis of an increase or decrease in the average value of pixel outputs in a predetermined region.

The tilt (tilt angle) of the document calculated in this way is stored in the memory 104.

Subsequently, in step S26, the controller 100 determines whether or not the tilt (tilt angle) of the document is within a predetermined allowable range (step S26).

If the tilt (tilt angle) of the document is within the allowable range (Yes in step S26), in step S27, the controller 100 causes the reader 111 to perform the document reading process (step S27).

In the subsequent step S28, the controller 100 causes the image corrector 114 to correct the image read in step S27 on the basis of the tilt (tilt angle) of the document calculated in step S26 (step S28).

In the subsequent step S29, the controller 100 causes the transporter 112 to output the document (step S29) and ends the process.

By detecting the tilt (tilt angle) of the document with the CIS for scanning a business card or card and correcting the image on the basis of the tilt, the digital multifunction peripheral 1 can detect the skew of a document while the document is being transported and correct the image.

Fourth Embodiment

Skew Detection Process for Document Reading by Digital Multifunction Peripheral 1 According to Fourth Embodiment of Invention A skew detection process for document reading by the digital multifunction peripheral 1 according to the fourth embodiment of the present invention will now be explained with reference to FIGS. 20 to 23.

Note that the other configurations of the digital multifunction peripheral 1 according to the fourth embodiment is the same as those according to the third embodiment, so descriptions thereof will be omitted.

FIG. 20 is an explanatory diagram illustrating a state in which a document is loaded on the tray of the ADF of the digital multifunction peripheral 1 according to the fourth embodiment of the present invention.

As illustrated in FIG. 20, the business card/card reader 113 is disposed above the transporter 112.

The difference from the third embodiment is that the business card/card reader 113 is disposed on the left side in the document transport direction.

Figure 21A:
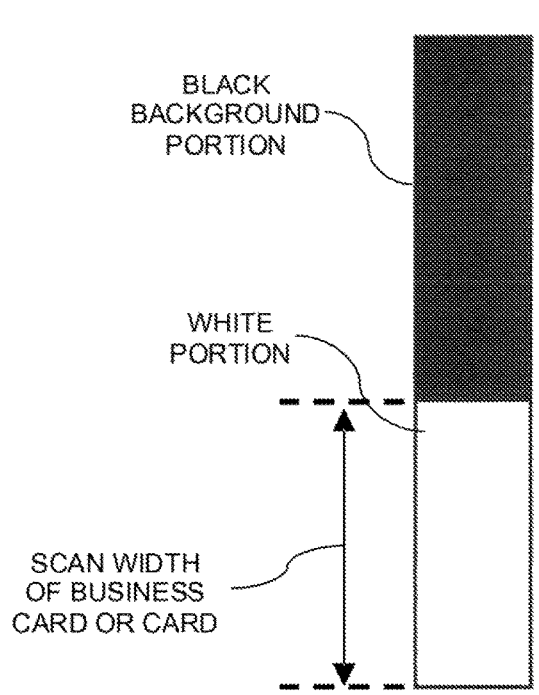
FIGS. 21A and 21B are explanatory diagrams illustrating an example pattern for skew detection disposed on a face opposing a CIS of a business card/card reader of the digital multifunction peripheral illustrated in FIG. 20.
Figure 21B:
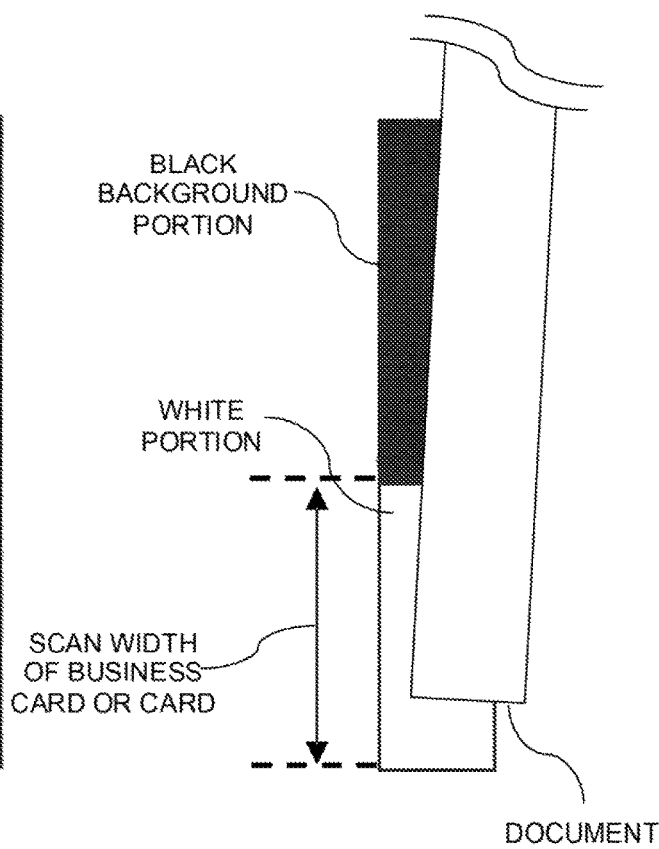

FIGS. 21A and 21B are explanatory diagrams illustrating an example pattern for skew detection disposed on a face opposing the CIS of the business card/card reader 113 of the digital multifunction peripheral 1 illustrated in FIG. 20.

As illustrated in FIG. 21A, a pattern is provided on the face opposing the CIS. The pattern includes a white portion and black background portions. The white portion is a portion of the opposing face colored in white along a length corresponding to the scan width of the business card or card. The black background portion is the portion colored in black on the right side of the white portion.

Note that, during document reading, the CIS reads not only the white portion corresponding to the scan width of a business card or card, but also the black background portion on the right side of the white portion.

Figure 22A:
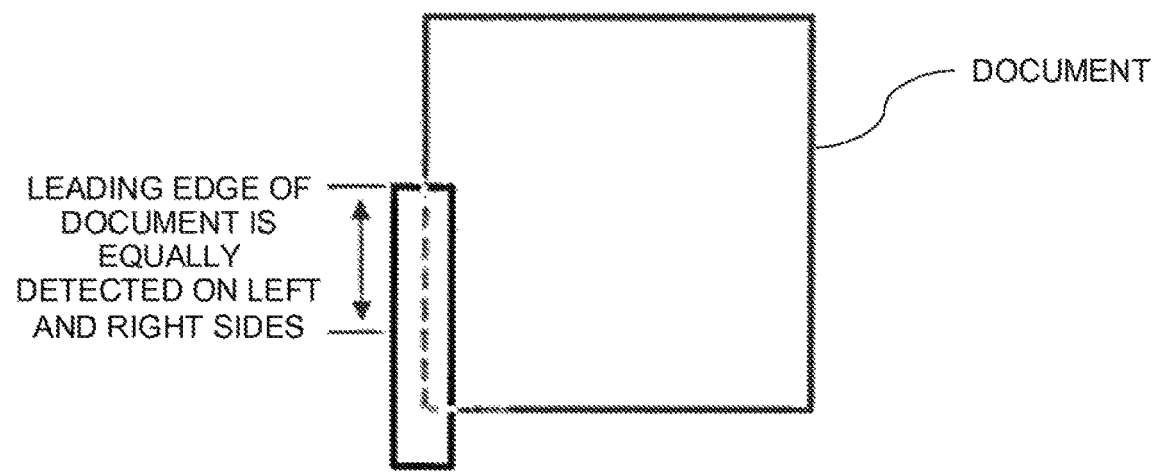
FIGS. 22A and 22B are explanatory diagrams illustrating the positional relation between the CIS of the business card/card reader of the digital multifunction peripheral according to the fourth embodiment of the present invention and the document being transported.
Figure 22B:
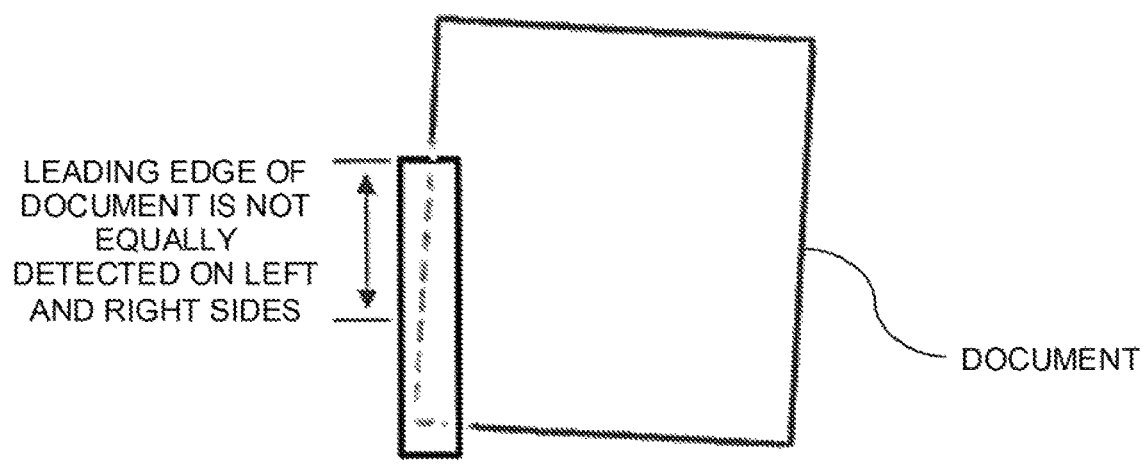

FIGS. 22A and 22B are explanatory diagrams illustrating the positional relation between the CIS of the business card/card reader 113 of the digital multifunction peripheral 1 according to the fourth embodiment of the present invention and the document being transported.

As illustrated in FIG. 22A, when the document is transported straight to the CIS without skew, the CIS detects the leading edge of the document at any two points in the black background portion at substantially the same timing.

Therefore, as illustrated in FIG. 22B, when the tilt (tilt angle) of the document transported to the CIS is within a predetermined range, the image is corrected on the basis of the tilt (tilt angle).

FIG. 23 is a flowchart illustrating an example document reading process for the digital multifunction peripheral 1 according to the fourth embodiment of the present invention.

Note that steps S41 to S43 and S45 to S52 in FIG. 23 corresponds to steps S21 to S23 and S25 to S32 in FIG. 19, so the descriptions thereof are omitted.

Here, the determination in step S44 in FIG. 23, which is not included in the third embodiment, will be described.

In step S43 in FIG. 23, the CIS starts the detection of the leading edge of the document (step S43). In the subsequent step S44, the controller 100 determines whether or not the timings of the detection of the leading edge of the document by the CIS in the black background portion are different on the left and right sides (step S44).

If the timings of the detection of the leading edge of the document by the CIS is different on the left and right side (Yes in step S44), in step S45, the controller 100 calculates the tilt (tilt angle) of the document on the basis of the difference in the times of detection of two points in the black background portion (step S45).

In a specific calculation method, for example, the tilt (tilt angle) of the document is calculated on the basis of an increase or decrease in the average value of the pixel outputs of a predetermined region.

The tilt (tilt angle) of the document calculated in this way is stored in the memory 104.

By detecting the tilt (tilt angle) of the document with the CIS for scanning a business card or card and correct the image on the basis of the tilt, the digital multifunction peripheral 1 can detect the skew of a document while the document is being transported and correct the image.

Fifth Embodiment

Schematic Configuration of Business Card/Card Reading Mechanism of Digital Multifunction Peripheral 1 According to Fifth Embodiment of Invention The schematic configuration of the business card/card reader 113 of the transporter 112 of the digital multifunction peripheral 1 according to the fifth embodiment of the present invention will now be described with reference to FIG. 24.

Note that the other configurations of the digital multifunction peripheral 1 according to the fifth embodiment is the same as those according to the first embodiment, so descriptions thereof will be omitted.

Figure 24:
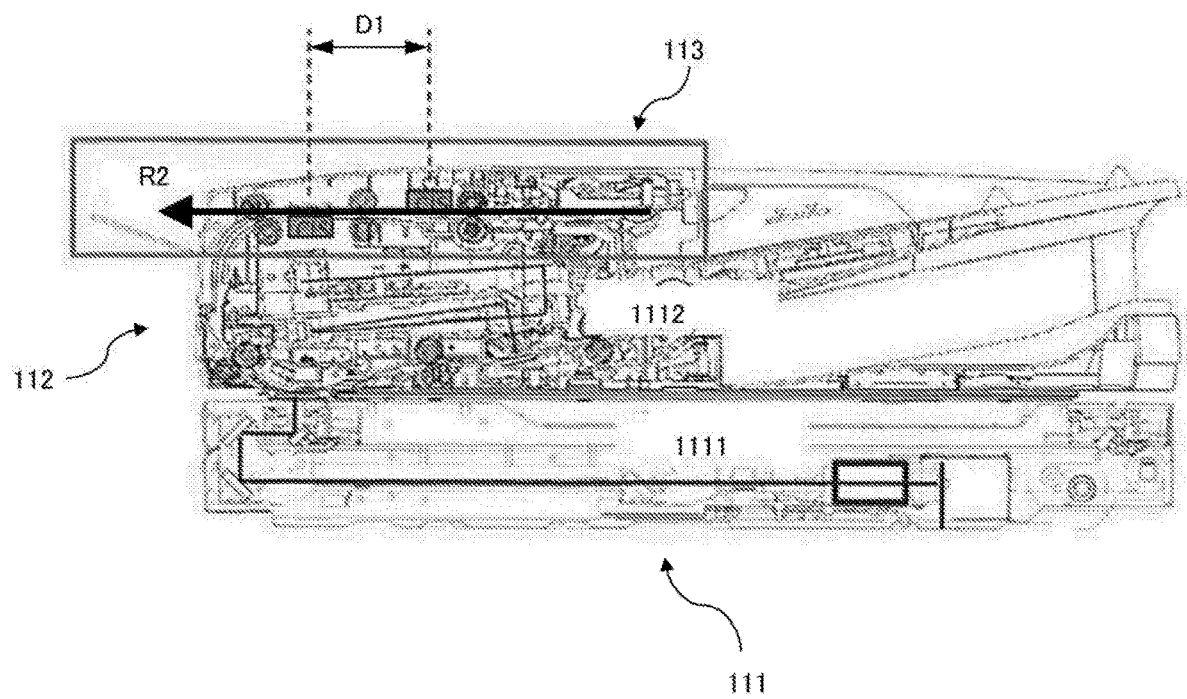
FIG. 24 is a cross-sectional diagram illustrating a schematic configuration of a business card/card reader of the digital multifunction peripheral according to a fifth embodiment of the present invention.

FIG. 24 is a cross-sectional diagram illustrating a schematic configuration of a business card/card reader 113 of the digital multifunction peripheral 1 according to the fifth embodiment of the present invention.

As illustrated in FIG. 24, the digital multifunction peripheral 1 according to the fifth embodiment of the present invention includes a reader 111, a transporter 112, and a business card/card reader 113.

The reader 111 includes a document front-face reader 1111 and a document back-face reader 1112, which respectively read the front and back faces of a document.

The difference from the first embodiment is that the business card/card reader 113 has two contact image sensors (CISs) for reading the front and back sides of the business card or card along a document transport path R2.

As illustrated in FIG. 24, the distance D1 between the two CISs should be larger than the length of the business card or card.

In this way, the back side of the business card or card can be read after the front side of the business card or card has been read. Therefore, the amount of memory required for image processing can be reduced.

By detecting the tilt of the document with the two CISs for scanning a business card or card is this way, the digital multifunction peripheral 1 can detect and prevent skew of a document while the document is being transported more efficiently and more precisely than in the past.

As in the third and fourth embodiments, by further providing the image corrector 114 and correcting the image on the basis of the tilt of the document detected by the two CISs, the image can be corrected with higher precision.

A preferred embodiment of the present invention also includes a combination of any of the above-mentioned embodiments.

Various modified examples of the present invention may be provided besides the above-described embodiments. These modifications should not be construed as not belonging to the scope of the present invention. The invention should include the meaning equivalent to the claims and all modifications within the scope.

What is claimed is:

1. An image reading device comprising:
   an operation unit that accepts commands from a user;
   a document transporter that transports a first document and a second document along a predetermined transport path;
   a first document reader that reads the first document having a predetermined first size and generates image data;
   a second document reader that reads the second document having a second size larger than the predetermined first size and generates image data;
   a document tilt detector that detects tilt of the second document relative to a transport direction of the predetermined transport path based on the image data for detecting the tilt of the second document; and
   a controller, wherein
   the controller causes the first document reader to read the first document and generate image data when the operation unit accepts a command to read the first document,
   the controller causes the first document reader to read a portion of the second document and generate image data for detecting tilt of the second document when the operation unit accepts a command to read the second document, the controller causing the document tilt detector to detect tilt of the second document relative to the transport direction of the predetermined transport path based on the image data for detecting tilt of the second document,
   the controller causes the document transporter to stop transport of the second document when the document tilt detector detects tilt of the second document, and
   the controller causes the second document reader to read the second document and generate image data when the document tilt detector detects no tilt of the second document.

2. The image reading device according to claim 1, wherein the predetermined transport path includes a first transport path and a second transport path connected to the first transport path, the first document reader is disposed in the first transport path, the second document reader is disposed in the second transport path, the controller causes the document transporter to transport the first document along the first transport path when the operation unit accepts an instruction to read the first document and causes the first document reader to read the first document and generate image data, the controller causes the document transporter to transport the second document along the first transport path when the operation unit accepts an instruction to read the second document and causes the first document reader to read a predetermined portion of the second document and generate image data for detecting tilt of the second document, the controller causes the document tilt detector to detect tilt of the second document relative to a transport direction of the first transport path based on the image data for detecting tilt of the second document, the controller causes the document transporter to stop transport of the second document when the document tilt detector detects tilt of the second document, and the controller causes the document transporter to transport the second document along the second transport path when the document tilt detector detects no tilt of the second document and causes the second document reader to read the second document and generate image data.

3. The image reading device according to claim 2, wherein the document tilt detector detects whether or not the second document tilts relative to the transport direction of the first transport path based on image data of a transport-direction leading edge portion of the second document read by the first document reader within a predetermined time.

4. The image reading device according to claim 2, further comprising:

a document feed tray on which the first document and the second document are loaded;

a first document output tray connected to the first transport path outputs the first document; and a second document output tray connected to the second transport path outputs the second document, wherein the first transport path includes a path that does not bend for transporting the first document and the second document from the document feed tray to the first document output tray, and the second transport path includes a path that bends for transporting the second document from the first transport path to the second document output tray.

5. The image reading device according to claim 1, wherein the document tilt detector detects whether or not the second document tilts relative to the transport direction of the predetermined transport path based on image data of a transport-direction leading edge portion of the second document read by the first document reader within a predetermined time.

6. The image reading device according to claim 1, further comprising:

an image corrector that corrects the image data read by the second document reader, wherein the controller causes the document tilt detector to detect a tilt angle of the second document relative to the transport direction of the predetermined transport path based on the image data for detecting tilt of the second document, the controller causes the document transporter to stop the transport of the second document when the document tilt detector detects tilt of the second document and a tilt angle of the second document is larger than a predetermined reference tilt angle, and when the tilt angle of the second document is smaller than or equal to the predetermined reference tilt angle, the controller causes the image corrector to correct the image data read by the second document reader based on the tilt angle.

7. An image forming apparatus comprising:

the image reading device according to claim 1; and an image forming unit that forms an image based on image data read by the first document reader or the second document reader.

* * * * *